US011070273B2

(12) United States Patent
Islam et al.

(10) Patent No.: US 11,070,273 B2
(45) Date of Patent: *Jul. 20, 2021

(54) REPORTING VARIATION OF BEAM QUALITY FOR BEAM MANAGEMENT

(71) Applicant: QUALCOMM Incorporated, San Diego, CA (US)

(72) Inventors: Muhammad Nazmul Islam, Littleton, MA (US); Juergen Cezanne, Ocean Township, NJ (US); Junyi Li, Chester, NJ (US); Sundar Subramanian, San Diego, CA (US); Tao Luo, San Diego, CA (US); Raghu Narayan Challa, San Diego, CA (US); Ruhua He, San Diego, CA (US); Yong Li, San Diego, CA (US); Jun Zhu, San Diego, CA (US); Tianyang Bai, Bridgewater, NJ (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/908,561

(22) Filed: Jun. 22, 2020

(65) Prior Publication Data

US 2020/0336190 A1    Oct. 22, 2020

Related U.S. Application Data

(63) Continuation of application No. 16/267,303, filed on Feb. 4, 2019, now Pat. No. 10,700,753.

(Continued)

(51) Int. Cl.
*H04B 7/06* (2006.01)
*H04B 17/327* (2015.01)
(Continued)

(52) U.S. Cl.
CPC ......... *H04B 7/0639* (2013.01); *H04B 7/0695* (2013.01); *H04B 17/327* (2015.01);
(Continued)

(58) Field of Classification Search
CPC .. H04B 7/0617; H04B 7/0695; H04B 7/0639; H04B 7/0408; H04B 7/0619;
(Continued)

(56) References Cited

U.S. PATENT DOCUMENTS 10,368,373 B2 * 7/2019 Nagaraja ........... H04W 74/0833
10,700,753 B2 * 6/2020 Islam ................... H04W 72/08
(Continued)

FOREIGN PATENT DOCUMENTS

WO     2017180187 A1    10/2017

OTHER PUBLICATIONS

International Search Report and Written Opinion—PCT/US2019/016685—ISA/EPO—dated May 14, 2019.
(Continued)

*Primary Examiner* — Eva Y Puente
(74) *Attorney, Agent, or Firm* — Loza & Loza LLP

(57) ABSTRACT

Aspects of the disclosure relate to a method of operating a scheduled entity for wireless communication. In some aspects, the scheduled entity detects a fluctuation in a beam strength of at least one transmit beam from a scheduling entity. The scheduled entity transmits a first message to the scheduling entity, the first message indicating at least the fluctuation in the beam strength of the at least one transmit beam from the scheduling entity.

18 Claims, 15 Drawing Sheets

Related U.S. Application Data

(60) Provisional application No. 62/627,687, filed on Feb. 7, 2018.

(51) Int. Cl.
| | | |
|---|---|---|
| *H04W 72/08* | (2009.01) | |
| *H04W 72/04* | (2009.01) | |
| *H04W 24/10* | (2009.01) | |
| *H04L 5/00* | (2006.01) | |
| *H04B 7/0452* | (2017.01) | |

(52) U.S. Cl.
CPC ......... *H04W 24/10* (2013.01); *H04W 72/046* (2013.01); *H04W 72/08* (2013.01); *H04B 7/0452* (2013.01); *H04L 5/0048* (2013.01)

(58) Field of Classification Search
CPC .. H04B 7/0626; H04B 17/309; H04B 7/0413; H04B 7/0452; H04B 17/318; H04B 1/715; H04B 7/01; H04B 7/0417; H04B 7/0421; H04B 7/0632; H04B 7/0686; H04B 7/0697; H04B 7/10; H04R 1/406; H04R 3/005; H04R 2201/403; H04R 2203/12; H04R 2430/20; H04R 2201/401; H04R 2430/23; H04R 29/007; H04R 5/027; H04R 2430/03; H04R 5/04; H04R 17/02
USPC ......................................................... 375/263
See application file for complete search history.

(56) References Cited

U.S. PATENT DOCUMENTS

| | | | | |
|---|---|---|---|---|
| 2017/0207843 | A1* | 7/2017 | Jung | .................. H04B 7/0695 |
| 2017/0288763 | A1 | 10/2017 | Yoo et al. | |
| 2017/0303264 | A1 | 10/2017 | Islam et al. | |
| 2018/0027594 | A1 | 1/2018 | Nagaraja et al. | |
| 2018/0287860 | A1 | 10/2018 | Xia et al. | |
| 2019/0150013 | A1 | 5/2019 | Zhang et al. | |
| 2019/0199412 | A1 | 6/2019 | Koskela et al. | |
| 2019/0200248 | A1 | 6/2019 | Basu Mallick et al. | |
| 2019/0222291 | A1 | 7/2019 | Wang et al. | |
| 2019/0238210 | A1 | 8/2019 | Tang et al. | |
| 2019/0245605 | A1 | 8/2019 | Islam et al. | |
| 2019/0268790 | A1 | 8/2019 | Kwon et al. | |
| 2019/0268794 | A1 | 8/2019 | Tsai et al. | |
| 2019/0319686 | A1* | 10/2019 | Chen, IV | ............. H04B 7/0639 |
| 2020/0014515 | A1* | 1/2020 | Qin | ..................... H04L 5/0012 |
| 2020/0212988 | A1* | 7/2020 | Lim | ..................... H04B 7/0695 |
| 2020/0274606 | A1* | 8/2020 | Kang | ................... H04W 24/10 |

OTHER PUBLICATIONS

Qualcomm: "Beam Management for NR", 3GPP Draft; 3GPP TSG-RAN1 #88bis, R1-1705581, Beam Management for NR, 3RD Generation-Partnership Project (3GPP), Mobile Competence Centre, 650, Route Des Lucioles, F-06921 Sophia-Antipolis Cedex, France, vol. RAN WG1, No. Spokane, USA; Apr. 3, 2017-Apr. 7, 2017, Apr. 2, 2017 (Apr. 2, 2017), XP051243709, pp. 1-7, Retrieved from the Internet: URL:http://www.3gpp.org/ftp/Meetings_3GPP_SYNC/RAN1/Docs/ [retrieved on Apr. 2, 2017] the whole document.

Samsung: "CSI-RS for Beam Management", 3GPP Draft; 3GPP TSG-RAN WG1#88, R1-1705351, CSI-RS for BM V5, 3RD Generation Partnership Project (3GPP), Mobile Competence Centre, 650, Route Des Lucioles, F-06921 Sophia-Antipolis Cedex, France, vol. RAN WG1, No. Spokane, USA; Apr. 3, 2017-Apr. 7, 2017, Apr. 2, 2017 (Apr. 2, 2017), XP051243481, 7 Pages, Retrieved from the Internet: URL:http://www.3gpp.org/ftp/Meetings_3GPP_SYNC/RAN1/Docs/ [retrieved on Apr. 2, 2017] p. 4.

Samsung: "NR 4-Step Random Access Procedure", 3GPP Draft; 3GPP TSG-RAN WG1 NR Ad Hoc, R1-1700891, 3rd Generation Partnership Project (3GPP), Mobile Competence Centre, 650, Route Des Lucioles, F-06921 Sophia-Antipolis Cedex, France, vol. RAN WG1, No. Spokane, WA; Jan. 16, 2017-Jan. 20, 2017, Jan. 16, 2017 (Jan. 16, 2017), XP051208407, 14 pages, Retrieved from the Internet: URL:http://www.3gpp.org/ftp/Meetings_3GPP_SYNC/RAN1/Docs/ [retrieved on Jan. 16, 2017], p. 11.

* cited by examiner

REPORTING VARIATION OF BEAM QUALITY FOR BEAM MANAGEMENT

CROSS-REFERENCE TO RELATED APPLICATIONS

This application is a continuation application of U.S. patent application Ser. No. 16/267,303, entitled "Reporting Variation of Beam Quality for Beam Management," filed on Feb. 4, 2019, which claims priority to and the benefit of U.S. Provisional Patent Application No. 62/627,687, entitled "Reporting Temporal Variation of Beam Quality for Beam Management," filed on Feb. 7, 2018, the entire contents of which are incorporated herein by reference as if fully set forth below in their entireties and for all applicable purposes.

TECHNICAL FIELD

The technology discussed below relates generally to wireless communication systems, and more particularly, to reporting variation of beam quality for beam management.

INTRODUCTION

In conventional wireless communication networks (e.g., 5G networks), a base station (BS) may establish multiple beam pair links with a user equipment (UE). For example, the BS may perform a beam sweep operation to find a first beam with respect to the UE and a second beam with respect to the UE. The BS may use the first beam to establish a first beam pair link with the UE and may use the second beam to establish a second beam pair link with the UE.

Often times, changes in the environment (e.g., an introduction of an obstacle) or other conditions may require frequent refinement of one or more of the beam pair links to maintain or improve system performance. However, the BS in conventional wireless communication networks may not initiate beam management procedures for refining beam pair links with an adequate frequency, which may reduce system performance.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In accordance with some aspects of the disclosure, a method for a scheduled entity to communicate with a scheduling entity in a wireless communication network is provided. The scheduled entity detects a fluctuation in a beam strength of at least one transmit beam from a scheduling entity and transmits a first message to the scheduling entity. The first message indicates at least the fluctuation in the beam strength of the at least one transmit beam from the scheduling entity.

In accordance with some aspects of the disclosure, a method for a scheduled entity to communicate with a scheduling entity in a wireless communication network is provided. The scheduled entity detects a fluctuation in a beam strength of at least one transmit beam from a scheduling entity. The scheduled entity transmits a message to the scheduling entity in response to the detection. The message may include a request to change a frequency of beam refinement operations with respect to the at least one transmit beam and/or a request to change a frequency of beam quality reports with respect to the at least one transmit beam. The scheduled entity may perform the beam refinement operations and/or may transmit the beam quality reports based on the message.

In accordance with some aspects of the disclosure, a method for a scheduling entity to communicate with a scheduled entity in a wireless communication network is provided. The scheduling entity obtains a first message from a scheduled entity. The first message may indicate at least a fluctuation in a beam strength of at least one transmit beam from a scheduling entity. The scheduling entity transmits a second message to the scheduled entity in response to the first message. The second message may change a frequency of beam refinement operations with respect to the at least one transmit beam and/or may change a frequency of beam quality reports with respect to the at least one transmit beam.

In accordance with some aspects of the disclosure, a method for a scheduling entity to communicate with a scheduled entity in a wireless communication network is provided. The scheduling entity obtains a message from a scheduled entity. The message may include a request to change a frequency of beam refinement operations with respect to the at least one transmit beam and/or a request to change a frequency of beam quality reports with respect to the at least one transmit beam. The scheduling entity schedules the beam refinement operations and/or the beam quality reports based on the message.

In accordance with some aspects of the disclosure, an apparatus for wireless communication is provided. The apparatus includes means for detecting a fluctuation in a beam strength of at least one transmit beam from a scheduling entity, and means for transmitting a first message to the scheduling entity. The first message may indicate at least the fluctuation in the beam strength of the at least one transmit beam from the scheduling entity.

In accordance with some aspects of the disclosure, an apparatus for wireless communication is provided. The apparatus includes means for detecting a fluctuation in a beam strength of at least one transmit beam from a scheduling entity. The apparatus further includes means for transmitting a message to the scheduling entity in response to the detection. The message may include a request to change a frequency of beam refinement operations with respect to the at least one transmit beam and/or a request to change a frequency of beam quality reports with respect to the at least one transmit beam. The apparatus further includes means for performing the beam refinement operations and/or transmitting the beam quality reports based on the message.

In accordance with some aspects of the disclosure, an apparatus for wireless communication is provided. The apparatus includes means for obtaining a first message from a scheduled entity. The first message may indicate at least a fluctuation in a beam strength of at least one transmit beam from a scheduling entity. The apparatus further includes means for transmitting a second message to the scheduled entity in response to the first message. The second message may change a frequency of beam refinement operations with respect to the at least one transmit beam and/or may change a frequency of beam quality reports with respect to the at least one transmit beam.

In accordance with some aspects of the disclosure, an apparatus for wireless communication is provided. The apparatus includes means for obtaining a message from a scheduled entity. The message may include a request to change a frequency of beam refinement operations with respect to the at least one transmit beam and/or a request to change a frequency of beam quality reports with respect to the at least one transmit beam. The apparatus further includes means for scheduling the beam refinement operations and/or the beam quality reports based on the message.

In accordance with some aspects of the disclosure, an apparatus for wireless communication is provided. The apparatus includes a processor, a transceiver communicatively coupled to the at least one processor, and a memory communicatively coupled to the at least one processor. The processor is configured to detect a fluctuation in a beam strength of at least one transmit beam from a scheduling entity. The processor is further configured to transmit a first message to the scheduling entity. The first message may indicate at least the fluctuation in the beam strength of the at least one transmit beam from the scheduling entity.

In accordance with some aspects of the disclosure, an apparatus for wireless communication is provided. The apparatus includes a processor, a transceiver communicatively coupled to the at least one processor, and a memory communicatively coupled to the at least one processor. The processor is configured to detect a fluctuation in a beam strength of at least one transmit beam from a scheduling entity. The processor is further configured to transmit a message to the scheduling entity in response to the detection. The message may include a request to change a frequency of beam refinement operations with respect to the at least one transmit beam and/or a request to change a frequency of beam quality reports with respect to the at least one transmit beam. The processor is configured to perform the beam refinement operations and/or transmit the beam quality reports based on the message.

In accordance with some aspects of the disclosure, an apparatus for wireless communication is provided. The apparatus includes a processor, a transceiver communicatively coupled to the at least one processor, and a memory communicatively coupled to the at least one processor. The processor is configured to obtain a first message from a scheduled entity. The first message may indicate at least a fluctuation in a beam strength of at least one transmit beam from a scheduling entity. The processor is further configured to transmit a second message to the scheduled entity in response to the first message. The second message may change a frequency of beam refinement operations with respect to the at least one transmit beam and/or change a frequency of beam quality reports with respect to the at least one transmit beam.

In accordance with some aspects of the disclosure, an apparatus for wireless communication is provided. The apparatus includes a processor, a transceiver communicatively coupled to the at least one processor, and a memory communicatively coupled to the at least one processor. The processor is configured to obtain a message from a scheduled entity. The message may include a request to change a frequency of beam refinement operations with respect to the at least one transmit beam and/or a request to change a frequency of beam quality reports with respect to the at least one transmit beam. The processor is further configured to schedule the beam refinement operations and/or the beam quality reports based on the message.

In accordance with some aspects of the disclosure, a non-transitory computer-readable medium storing computer-executable code is provided. The non-transitory computer-readable medium includes code for causing a computer to detect a fluctuation in a beam strength of at least one transmit beam from a scheduling entity, and transmit a first message to the scheduling entity. The first message may indicate at least the fluctuation in the beam strength of the at least one transmit beam from the scheduling entity.

In accordance with some aspects of the disclosure, a non-transitory computer-readable medium storing computer-executable code is provided. The non-transitory computer-readable medium includes code for causing a computer to detect a fluctuation in a beam strength of at least one transmit beam from a scheduling entity and transmit a message to the scheduling entity in response to the detection. The message may include a request to change a frequency of beam refinement operations with respect to the at least one transmit beam and/or a request to change a frequency of beam quality reports with respect to the at least one transmit beam. The non-transitory computer-readable medium further includes code for causing a computer to perform the beam refinement operations and/or transmit the beam quality reports based on the message.

In accordance with some aspects of the disclosure, a non-transitory computer-readable medium storing computer-executable code is provided. The non-transitory computer-readable medium includes code for causing a computer to obtain a first message from a scheduled entity. The first message may indicate at least a fluctuation in a beam strength of at least one transmit beam from a scheduling entity. The non-transitory computer-readable medium further includes code for causing a computer to transmit a second message to the scheduled entity in response to the first message. The second message may change a frequency of beam refinement operations with respect to the at least one transmit beam and/or change a frequency of beam quality reports with respect to the at least one transmit beam.

In accordance with some aspects of the disclosure, a non-transitory computer-readable medium storing computer-executable code is provided. The non-transitory computer-readable medium includes code for causing a computer to obtain a message from a scheduled entity. The message may include a request to change a frequency of beam refinement operations with respect to the at least one transmit beam and/or a request to change a frequency of beam quality reports with respect to the at least one transmit beam. The non-transitory computer-readable medium further includes code for causing a computer to schedule the beam refinement operations and/or the beam quality reports based on the message.

DETAILED DESCRIPTION

Figure 1:
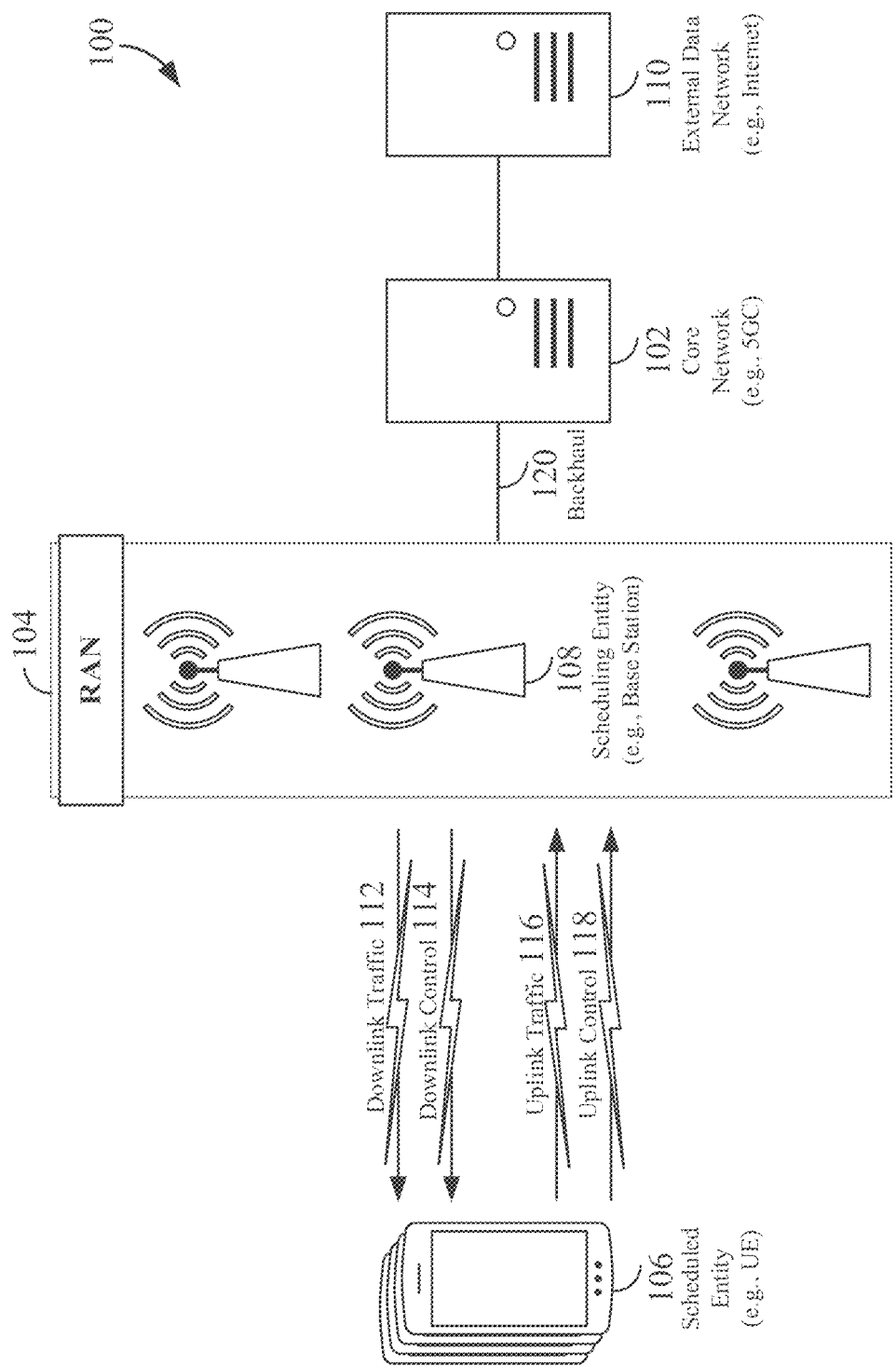
FIG. 1 is a schematic illustration of a wireless communication system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

The term new radio (NR) may generally refer to the new radio access technology (e.g., 5G technology) undergoing definition and standardization by 3GPP in Release 15.

The term beamforming may generally refer to a directional signal transmission or reception. For a beamformed transmission, the amplitude and phase of each antenna in an array of antennas may be precoded, or controlled to create a desired (i.e., directional) pattern of constructive and destructive interference in the wavefront.

The term multiple-input multiple-output (MIMO) may generally refer to a multi-antenna technology that exploits multipath signal propagation so that the information-carrying capacity of a wireless link can be multiplied by using multiple antennas at the transmitter and receiver to send multiple simultaneous streams. At the multi-antenna transmitter, a suitable precoding algorithm (scaling the respective streams' amplitude and phase) is applied (in some examples, based on known channel state information). At the multi-antenna receiver, the different spatial signatures of the respective streams (and, in some examples, known channel state information) can enable the separation of these streams from one another. In single-user MIMO, the transmitter sends one or more streams to the same receiver, taking advantage of capacity gains associated with using multiple Tx, Rx antennas in rich scattering environments where channel variations can be tracked. The receiver may track these channel variations and provide corresponding feedback to the transmitter. This feedback may include channel quality information (CQI), the number of preferred data streams (e.g., rate control, a rank indicator (RI)), and a precoding matrix index (PMI).

The term MU-MIMO may generally refer to a multi-antenna technology where a base station, in communication with a large number of UEs, can exploit multipath signal propagation to increase overall network capacity by increasing throughput and spectral efficiency, and reducing the required transmission energy. The transmitter may attempt to increase the capacity by transmitting to multiple users using its multiple transmit antennas at the same time, and also using the same allocated time-frequency resources. The receiver may transmit feedback including a quantized version of the channel so that the transmitter can schedule the receivers with good channel separation. The transmitted data is precoded to maximize throughput for users and minimize inter-user interference.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3$^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
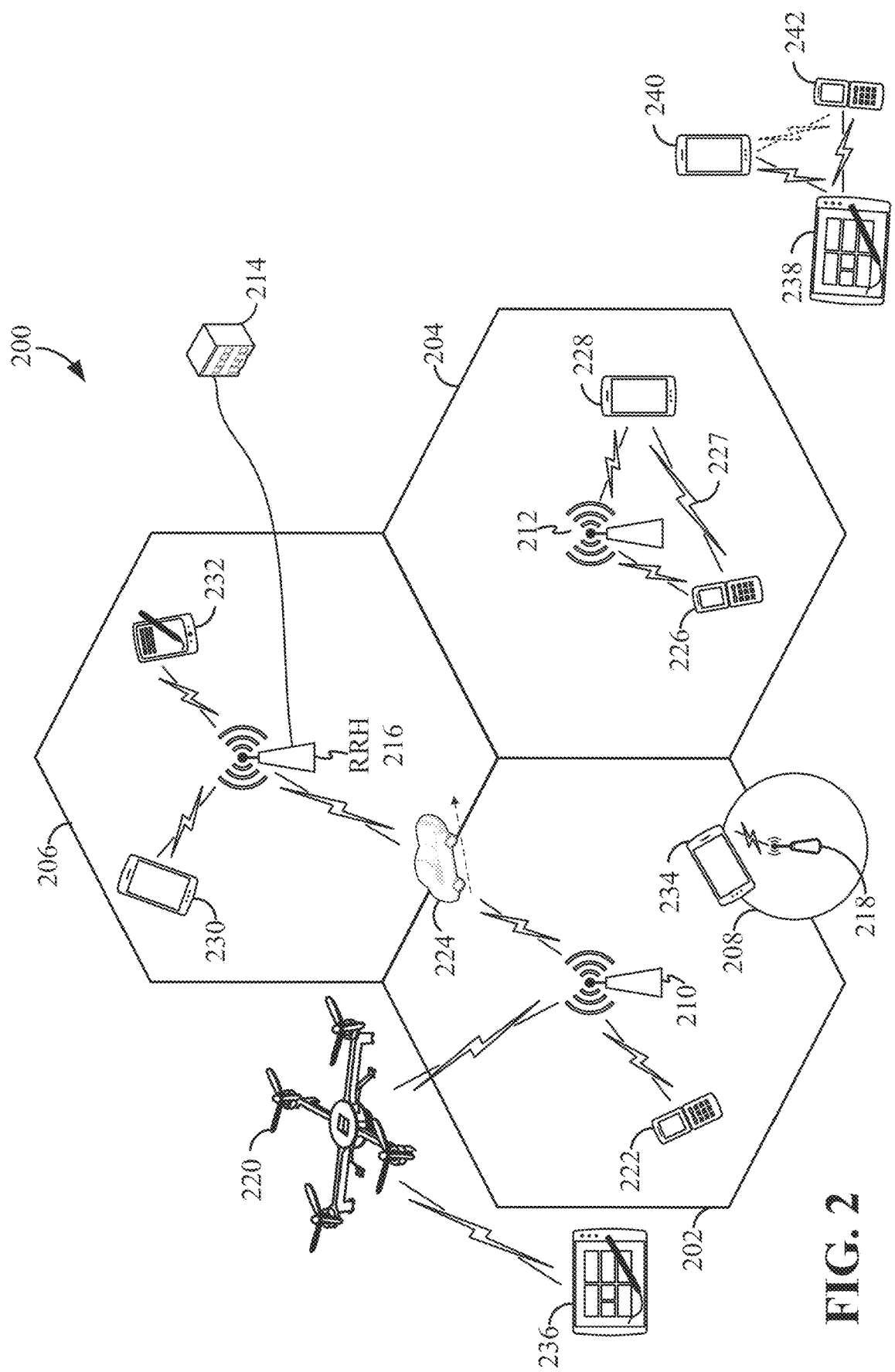
FIG. 2 is a conceptual illustration of an example of a radio access network.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Figure 3:
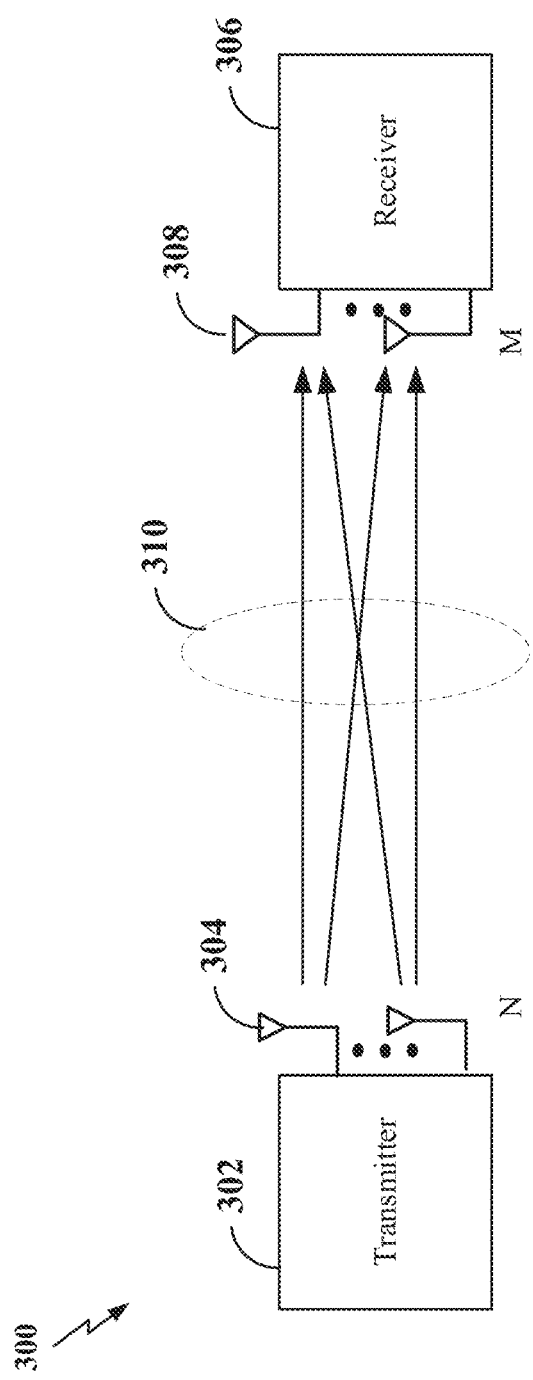
FIG. 3 is a block diagram illustrating a wireless communication system supporting multiple-input multiple-output (MIMO) communication.

In some aspects of the disclosure, the scheduling entity and/or scheduled entity may be configured for beamforming and/or multiple-input multiple-output (MIMO) technology. FIG. 3 illustrates an example of a wireless communication system 300 supporting MIMO. In a MIMO system, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a scheduling entity 108, a scheduled entity 106, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 300 is limited by the number of transmit or receive antennas 304 or 308, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit the CSI-RS with separate C-RS sequences for each layer to provide for multi-layer channel estimation. From the CSI-RS, the UE may measure the channel quality across layers and resource blocks and feed back the CQI and RI values to the base station for use in updating the rank and assigning REs for future downlink transmissions.

In the simplest case, as shown in FIG. 3, a rank-2 spatial multiplexing transmission on a 2×2 MIMO antenna configuration will transmit one data stream from each transmit antenna 304. Each data stream reaches each receive antenna 308 along a different signal path 310. The receiver 306 may then reconstruct the data streams using the received signals from each receive antenna 308.

In order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of scheduling entities 108 and scheduled entities 106 may include suitable hardware and capabilities (e.g., an encoder, a decoder, and/or a CODEC) to utilize one or more of these channel codes for wireless communication.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Figure 4:
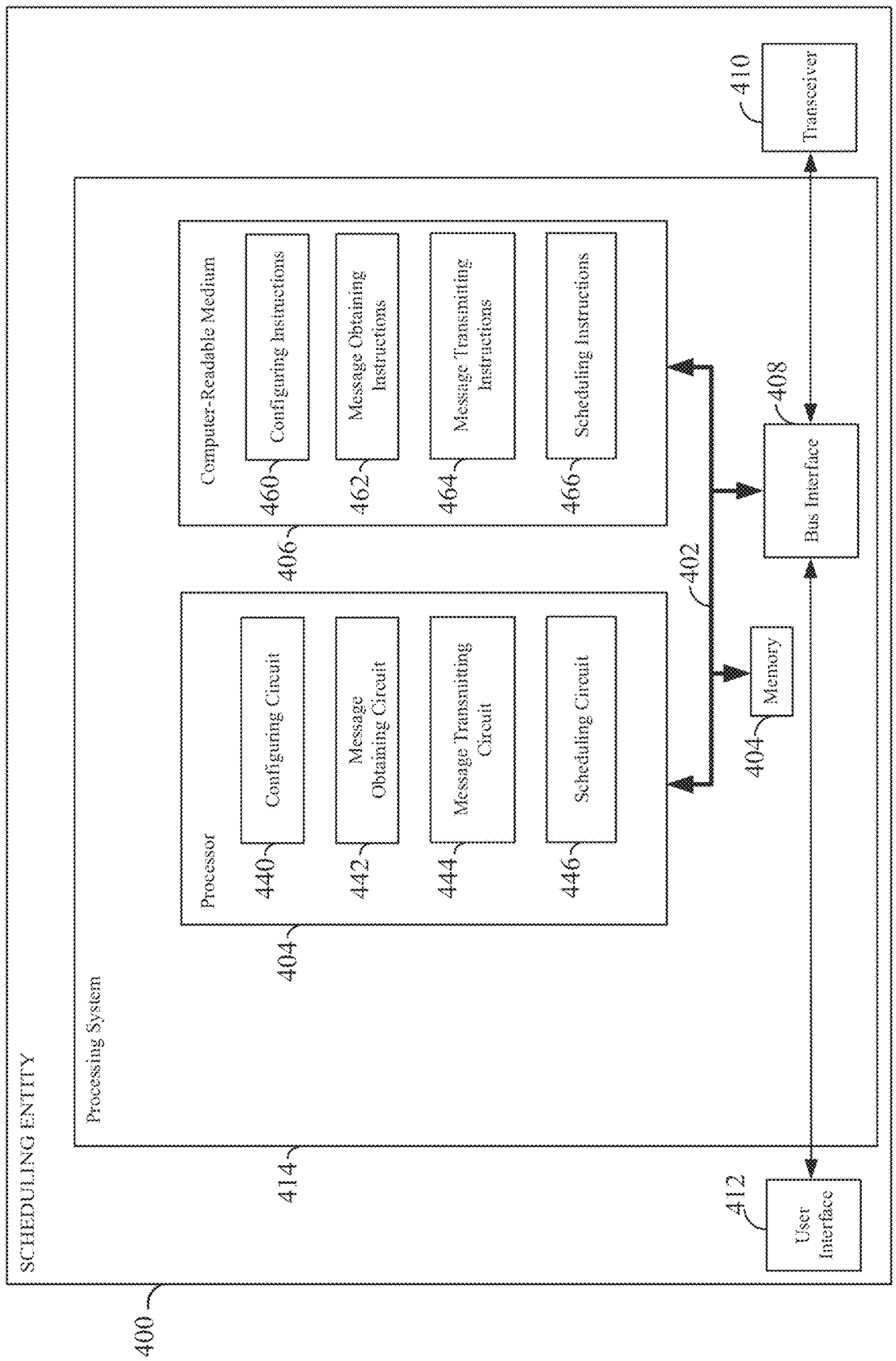
FIG. 4 is a block diagram conceptually illustrating an example of a hardware implementation for a scheduling entity according to some aspects of the disclosure.

FIG. 4 is a block diagram illustrating an example of a hardware implementation for a scheduling entity 400 employing a processing system 414. For example, the scheduling entity 400 may be a base station as illustrated in any one or more of FIGS. 1, 2, and/or 3.

The scheduling entity 400 may be implemented with a processing system 414 that includes one or more processors 404. Examples of processors 404 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 400 may be configured to perform any one or more of the functions described herein. That is, the processor 404, as utilized in a scheduling entity 400, may be used to implement any one or more of the processes and procedures described below and illustrated in FIGS. 14 and 15.

In this example, the processing system 414 may be implemented with a bus architecture, represented generally by the bus 402. The bus 402 may include any number of interconnecting buses and bridges depending on the specific application of the processing system 414 and the overall design constraints. The bus 402 communicatively couples together various circuits including one or more processors (represented generally by the processor 404), a memory 405, and computer-readable media (represented generally by the computer-readable medium 406). The bus 402 may also link various other circuits such as timing sources, peripherals, voltage regulators, and power management circuits, which are well known in the art, and therefore, will not be described any further. A bus interface 408 provides an interface between the bus 402 and a transceiver 410. The transceiver 410 provides a communication interface or means for communicating with various other apparatus over a transmission medium. Depending upon the nature of the apparatus, a user interface 412 (e.g., keypad, display, speaker, microphone, joystick) may also be provided. Of course, such a user interface 412 is optional, and may be omitted in some examples, such as a base station.

In some aspects of the disclosure, the processor 404 may include configuring circuitry 440 configured for various functions, including, for example, configuring a scheduled entity to transmit the first message. For example, the configuring circuitry 440 may be configured to implement one or more of the functions described below in relation to FIG. 14, including, e.g., block 1402.

In some aspects of the disclosure, the processor 404 may include message obtaining circuitry 442 configured for various functions, including, for example, obtaining a first message from a scheduled entity, the first message indicating at least a fluctuation in a beam strength of at least one transmit beam from a scheduling entity and/or obtaining a message from a scheduled entity, the message including a request to change (e.g., increase or decrease) a frequency of beam refinement operations with respect to the at least one transmit beam and/or a request to change (e.g., increase or decrease) a frequency of beam quality reports with respect to the at least one transmit beam. For example, the message obtaining circuitry 442 may be configured to implement one or more of the functions described below in relation to FIGS. 14 and 15, including, e.g., blocks 1406 and 1502.

In some aspects of the disclosure, the processor 404 may include message transmitting circuitry 444 configured for various functions, including, for example, transmitting a second message to the scheduled entity in response to the first message, wherein the second message changes (e.g., increases or decreases) a frequency of beam refinement operations with respect to the at least one transmit beam and/or changes (e.g., increases or decreases) a frequency of beam quality reports with respect to the at least one transmit beam, and/or transmitting the threshold to the scheduled entity. For example, the message transmitting circuitry 444 may be configured to implement one or more of the functions described below in relation to FIG. 14, including, e.g., blocks 1404 and 1408.

In some aspects of the disclosure, the processor 404 may include scheduling circuitry 446 configured for various functions, including, for example, scheduling beam refinement operations and/or transmission of beam quality reports from the scheduled entity based on the second message, and/or scheduling the beam refinement operations and/or the beam quality reports based on the message. For example, the scheduling circuitry 446 may be configured to implement one or more of the functions described below in relation to FIGS. 14 and 15, including, e.g., blocks 1410 and 1504.

The processor 404 is responsible for managing the bus 402 and general processing, including the execution of software stored on the computer-readable medium 406. The software, when executed by the processor 404, causes the processing system 414 to perform the various functions described below for any particular apparatus. The computer-readable medium 406 and the memory 405 may also be used for storing data that is manipulated by the processor 404 when executing software.

One or more processors 404 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 406. The computer-readable medium 406 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 406 may reside in the processing system 414, external to the processing system 414, or distributed across multiple entities including the processing system 414. The computer-readable medium 406 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 406 may include configuring software 460 configured for various functions, including, for example, configuring the scheduled entity to transmit the first message. For example, the configuring software 460 may be configured to implement one or more of the functions described above in relation to FIG. 14, including, e.g., block 1402.

In one or more examples, the computer-readable storage medium 406 may include message obtaining software 462 configured for various functions, including, for example, obtaining a first message from a scheduled entity, the first message indicating at least a fluctuation in a beam strength of at least one transmit beam from a scheduling entity. In some examples, the message obtaining software 462 may be configured for obtaining a message from a scheduled entity, the message including a request to change (e.g., increase or decrease) a frequency of beam refinement operations with respect to the at least one transmit beam and/or a request to change (e.g., increase or decrease) a frequency of beam quality reports with respect to the at least one transmit beam. For example, the message obtaining software 462 may be configured to implement one or more of the functions described above in relation to FIGS. 14 and 15, including, e.g., blocks 1406 and 1502.

In one or more examples, the computer-readable storage medium 406 may include message transmitting software 464 configured for various functions, including, for example, transmitting a second message to the scheduled entity in response to the first message, wherein the second message changes (e.g., increases or decreases) a frequency of beam refinement operations with respect to the at least one transmit beam and/or changes (e.g., increases or decreases) a frequency of beam quality reports with respect to the at least one transmit beam, and/or transmitting the threshold to the scheduled entity. For example, the message transmitting software 464 may be configured to implement one or more of the functions described above in relation to FIG. 14, including, e.g., blocks 1404 and 1408.

In one or more examples, the computer-readable storage medium 406 may include scheduling software 466 configured for various functions, including, for example, scheduling beam refinement operations and/or transmission of beam quality reports from the scheduled entity based on the second message, and/or scheduling the beam refinement operations and/or the beam quality reports based on the message. For example, the scheduling software 466 may be configured to implement one or more of the functions described above in relation to FIGS. 14 and 15, including, e.g., blocks 1410 and 1504.

Figure 5:
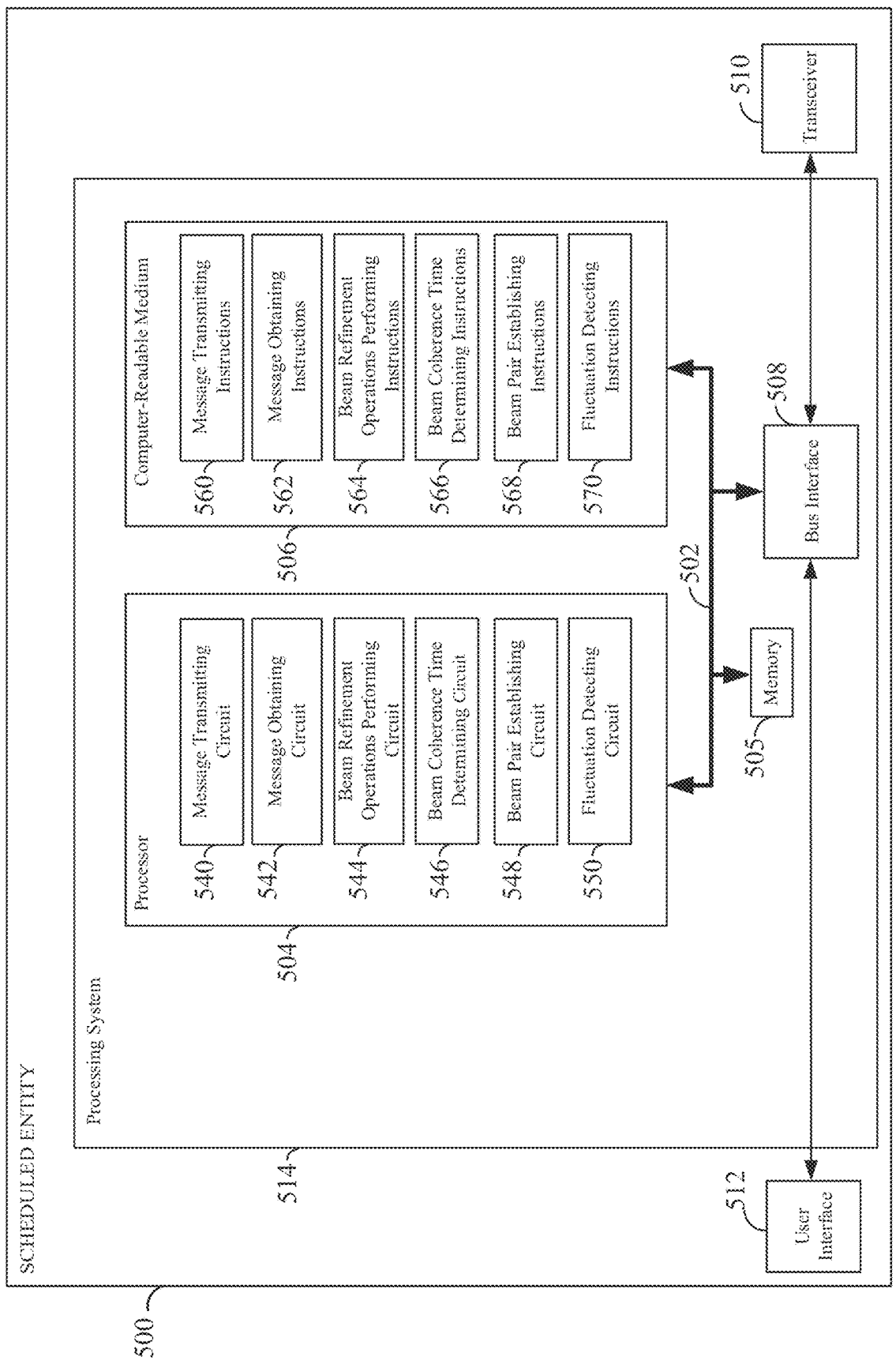
FIG. 5 is a block diagram conceptually illustrating an example of a hardware implementation for a scheduled entity according to some aspects of the disclosure.

FIG. 5 is a conceptual diagram illustrating an example of a hardware implementation for an exemplary scheduled entity 500 employing a processing system 514. In accordance with various aspects of the disclosure, an element, or any portion of an element, or any combination of elements may be implemented with a processing system 514 that includes one or more processors 504. For example, the scheduled entity 500 may be a user equipment (UE) as illustrated in any one or more of FIGS. 1, 2, and/or 3.

The processing system 514 may be substantially the same as the processing system 414 illustrated in FIG. 4, including a bus interface 508, a bus 502, memory 505, a processor 504, and a computer-readable medium 506. Furthermore, the scheduled entity 500 may include a user interface 512 and a transceiver 510 substantially similar to those described above in FIG. 4. That is, the processor 504, as utilized in a scheduled entity 500, may be used to implement any one or more of the processes described below and illustrated in FIGS. 12 and 13.

In some aspects of the disclosure, the processor 504 may include message transmitting circuitry 540 configured for various functions, including, for example, transmitting a first message to the scheduling entity, the first message indicating at least the fluctuation in the beam strength of the at least one transmit beam from the scheduling entity, and/or transmitting a message to the scheduling entity in response to the detection, the message including a request to change (e.g., increase or decrease) a frequency of beam refinement operations with respect to the at least one transmit beam and/or a request to change (e.g., increase or decrease) a frequency of beam quality reports with respect to the at least one transmit beam. For example, the message transmitting circuitry 540 may be configured to implement one or more of the functions described below in relation to FIGS. 12 and 13, including, e.g., blocks 1210 and 1304.

In some aspects of the disclosure, the processor 504 may include message obtaining circuitry 542 configured for various functions, including, for example, obtaining a second message from the scheduling entity in response to the first message, wherein the second message changes (e.g., increases or decreases) a frequency of beam refinement operations with respect to the at least one transmit beam and/or changes (e.g., increases or decreases) a frequency of beam quality reports with respect to the at least one transmit beam, and/or obtaining an indication to use a receive beam with a constant beam width when detecting the fluctuation in the beam strength of the at least one transmit beam, wherein the first message further indicates the constant beam width. For example, the message obtaining circuitry 542 may be configured to implement one or more of the functions described below in relation to FIG. 12, including, e.g., blocks 1204 and 1212.

In some aspects of the disclosure, the processor 504 may include beam refinement operations performing circuitry 544 configured for various functions, including, for example, performing the beam refinement operations and/or transmitting the beam quality reports based on the second message, and/or performing the beam refinement operations and/or transmitting the beam quality reports based on the message. For example, the beam refinement operations performing circuitry 544 may be configured to implement one or more of the functions described below in relation to FIGS. 12 and 13, including, e.g., blocks 1214 and 1306.

In some aspects of the disclosure, the processor 504 may include beam coherence time determining circuitry 546 configured for various functions, including, for example, determining a beam coherence time of the at least one transmit beam, wherein the fluctuation is indicated as the beam coherence time. For example, the beam coherence time determining circuitry 546 may be configured to implement one or more of the functions described below in relation to FIG. 12, including, e.g., block 1208.

In some aspects of the disclosure, the processor 504 may include beam pair establishing circuitry 548 configured for various functions, including, for example, establishing one or more beam pairs with the scheduling entity. For example, the beam pair establishing circuitry 548 may be configured to implement one or more of the functions described below in relation to FIG. 12, including, e.g., block 1202.

In some aspects of the disclosure, the processor 504 may include fluctuation detecting circuitry 550 configured for various functions, including, for example, detecting a fluctuation in a beam strength of at least one transmit beam from a scheduling entity. For example, the fluctuation detecting circuitry 550 may be configured to implement one or more of the functions described below in relation to FIGS. 12 and 13, including, e.g., blocks 1206 and 1302.

In one or more examples, the computer-readable storage medium 506 may include message transmitting software 560 configured for various functions, including, for example, transmitting a first message to the scheduling entity, the first message indicating at least the fluctuation in the beam strength of the at least one transmit beam from the scheduling entity, and/or transmitting a message to the scheduling entity in response to the detection, the message including a request to change (e.g., increase or decrease) a frequency of beam refinement operations with respect to the at least one transmit beam and/or a request to change (e.g., increase or decrease) a frequency of beam quality reports with respect to the at least one transmit beam. For example, the message transmitting software 560 may be configured to implement one or more of the functions described above in relation to FIGS. 12 and 13, including, e.g., blocks 1210 and 1304.

In one or more examples, the computer-readable storage medium 506 may include message obtaining software 562 configured for various functions, including, for example, obtaining a second message from the scheduling entity in response to the first message, wherein the second message changes (e.g., increases or decreases) a frequency of beam refinement operations with respect to the at least one transmit beam and/or changes (e.g., increases or decreases) a frequency of beam quality reports with respect to the at least one transmit beam, and/or obtaining an indication to use a receive beam with a constant beam width when detecting the fluctuation in the beam strength of the at least one transmit beam, wherein the first message further indicates the constant beam width. For example, the message obtaining software 562 may be configured to implement one or more of the functions described above in relation to FIG. 12, including, e.g., block 1204.

In one or more examples, the computer-readable storage medium 506 may include beam refinement operations performing software 564 configured for various functions, including, for example, performing the beam refinement operations and/or transmitting the beam quality reports based on the second message, and/or performing the beam refinement operations and/or transmitting the beam quality reports based on the message. For example, the beam refinement operations performing software 564 may be configured to implement one or more of the functions described above in relation to FIGS. 12 and 13, including, e.g., blocks 1214 and 1306.

In one or more examples, the computer-readable storage medium 506 may include beam coherence time determining software 566 configured for various functions, including, for example, determining a beam coherence time of the at least one transmit beam, wherein the fluctuation is indicated as the beam coherence time. For example, the beam coherence time determining software 566 may be configured to implement one or more of the functions described above in relation to FIG. 12, including, e.g., block 1208.

In one or more examples, the computer-readable storage medium 506 may include beam pair establishing software 568 configured for various functions, including, for example, establishing one or more beam pairs with the scheduling entity. For example, the beam pair establishing software 568 may be configured to implement one or more of the functions described above in relation to FIG. 12, including, e.g., block 1202.

In one or more examples, the computer-readable storage medium 506 may include fluctuation detecting software 570 configured for various functions, including, for example, detecting a fluctuation in a beam strength of at least one transmit beam from a scheduling entity. For example, the fluctuation detecting software 570 may be configured to implement one or more of the functions described above in relation to FIGS. 12 and 13, including, e.g., blocks 1206 and 1302.

In the aspects described herein, reference is made to beam management procedures (e.g., P-1 beam management, P-2 beam management, P-3 beam management, U-1 beam management, U-2 beam management) that may be performed by entities in wireless communication networks (e.g., 5G). Examples of these beam management procedures will now be described.

During P-1 beam management, a base station may transmit periodic reference signals. For example, such reference signals may include one or more of synchronization signals, channel state information reference signals (CSI-RS), mobility reference signals, or combinations thereof. The base station may use broad beams (e.g., wide beams for increased area coverage) during P-1 beam management.

During P-2 beam management, the base station may transmit different aperiodic reference signals with different transmit beams (e.g., the different aperiodic reference signals may be transmitted in different directions using beamforming). The base station may use refined narrow beams (e.g., narrow beams relative to the previously discussed wide beams) during P-2 beam management. The UE may maintain its receive beam constant and may find the optimal narrow beam (e.g., a narrow beam from the base station having the highest signal strength) while receiving these reference signals during P-2 beam management.

During P-3 beam management, the base station may transmit multiple aperiodic reference signals with the same transmit beam. The UE may try to use different receive beams while receiving these aperiodic reference signals and may find the optimal receive beam (e.g., a receive beam providing the highest signal strength) for the corresponding transmit beam.

During U-2 beam management, the UE may transmit different aperiodic reference signals (also referred to as UL reference signals) with different transmit beams (also referred to as UL transmit beams) and the base station may receive the reference signals with the same receive beam. After receiving these reference signals, the base station may find the optimal transmit beam (e.g., a transmit beam having the highest signal strength) from the UE.

During U-3 beam management, the UE may transmit different aperiodic reference signals (also referred to UL reference signals) with the same transmit beam and the base station may receive these reference signals with different receive beams. After receiving these reference signals, the base station may find the optimal receive beam (e.g., a receive beam providing the highest signal strength).

The previously described U-2 and U-3 beam management procedures may be useful for UEs without beam correspondence, since such UEs may not find a suitable UL transmit beam based on a previously determined optimal receive beam.

As used herein, the term "beam" may denote an antenna pattern that a transmitter uses to transmit a signal in a particular direction or may denote an antenna pattern that a receiver uses to receive a signal from a particular direction. In a millimeter wave system, a transmitter may provide coverage by transmitting a set of reference signals through different beams pointed in different directions in a sweeping manner. These different reference signals, transmitted through different beams, may be placed in a different set of resources that the UE uses to monitor the quality of a radio link between itself and the network. For example, the reference signals may include synchronization signal blocks, a CSI-RS, a mobility reference signal, or combinations thereof. As used herein, the term "beam management" may denote a process for managing multiple beams between a base station and a UE. It should be noted that the term "beam management" may be used interchangeably with the term "link reconfiguration."

Wireless communication networks (e.g., 5G) may perform a beam management procedure to establish multiple beam pair links. For example, a base station may perform a first beam sweep operation (also referred to as a P-1 beam sweep operation) with respect to a UE to find one or more beams (also referred to as P-1 beams) Each of the beams found by the base station may be used to establish a beam pair link with the UE. For example, a base station may find a first beam with respect to the UE and a second beam with respect to the UE as a result of a first beam sweep operation. The first beam may be used to establish a first beam pair link with the UE and the second beam may be used to establish a second beam pair link with the UE. The base station may then perform a second beam sweep operation (also referred to as a P-2 beam sweep operation) to refine the first beam and may perform a third beam sweep operation (also referred to as a P-3 beam sweep operation) to refine the second beam.

After the P-1 beam sweep operation, the UE may transmit a report (also referred to as a P-1 report) indicating the quality and index of the P-1 beams. For example, the UE may report the quality of a P-1 beam by transmitting a measurement (e.g., reference signal received power (RSRP)) of a reference signal received by the UE via the P-1 beam. The base station may determine an index for the P-2 beam sweep operation and an index for the P-3 beam sweep operation based on the quality and/or index of the P-1 beams. For example, the base station may perform the P-1, P-2 and P-3 beam sweep operations by transmitting synchronization signals and CSI-RS. Synchronization signals may include a PSS, an SSS, a PBCH and/or demodulation reference signals (DMRSs) of PBCH signals.

For example, after the first and second beam pair links are established using the previously described P-1, P-2, and P-3 beam sweep operations, there may be a reduction in the strength of the first beam pair link and/or the second beam pair link (e.g., due to a change in the environment that affects the path of a beam pair link). Therefore, the base station may need to refine the first beam with another P-2 beam sweep operation and may need to refine the second beam with another P-3 beam sweep operation. In conventional approaches, the base station typically controls the frequency of such P-2 and P-3 beam sweep operations. For example, the base station may detect the fluctuation of an RSRP reported by the UE and may determine the frequency (e.g., periodicity) of the P-2 and P-3 beam sweep operations.

Figure 6:
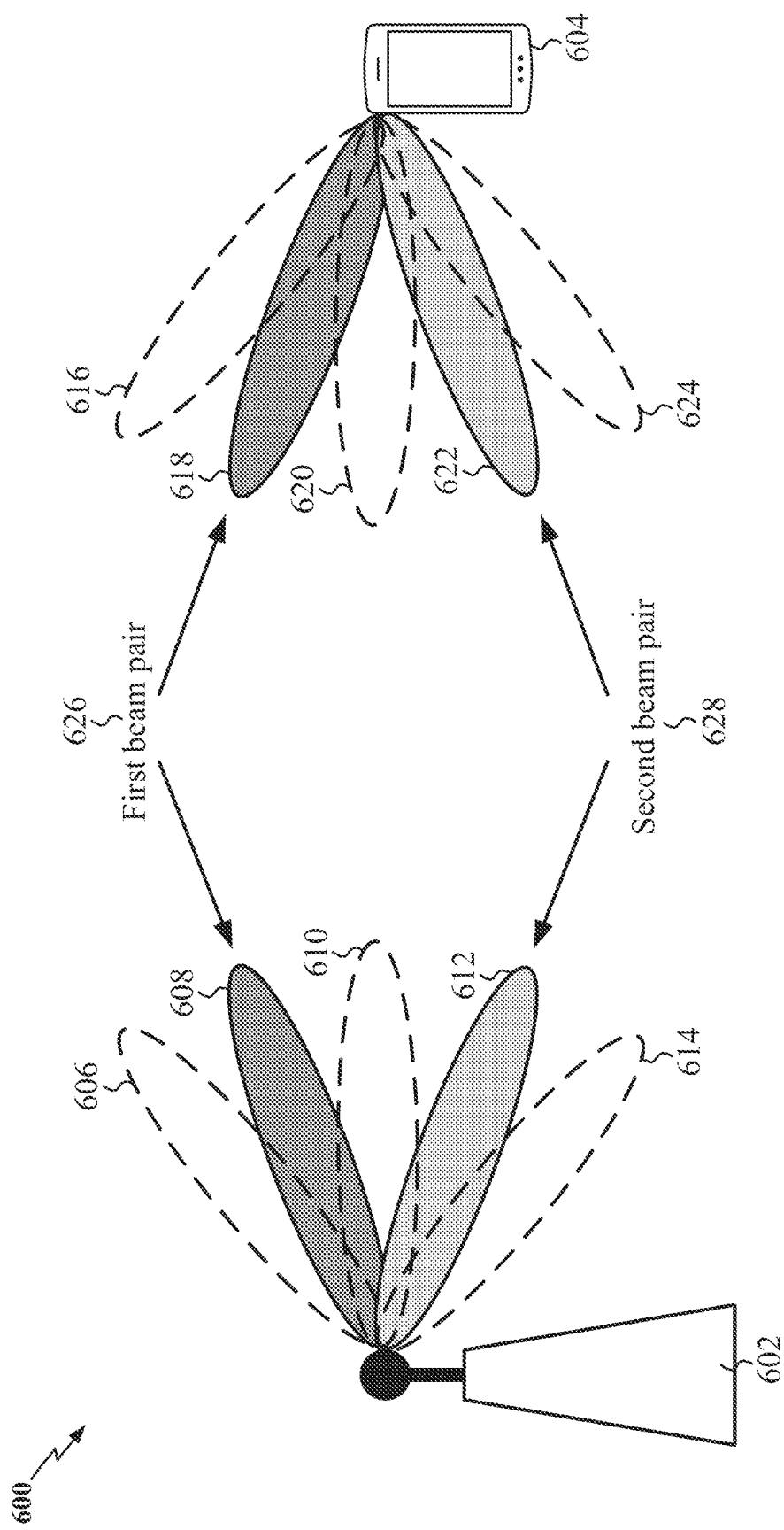
FIG. 6 is an example wireless communication network in accordance with various aspects of the disclosure.

FIG. 6 is an example wireless communication network 600 in accordance with various aspects of the disclosure. As shown in FIG. 6, the wireless communication network 600 may include a base station 602 and a UE 604. In the aspects described herein, the base station 602 and the UE 604 have beamforming capabilities. Accordingly, the base station 602 may find one or more beams for communication with the UE 604 by performing a P-1 beam sweep operation. For example, with reference to FIG. 6, the base station 602 may sweep through a set of five transmit beams, such as the transmit beams 606, 608, 610, 612 and 614. In other words, the base station 602 may successively transmit five beams pointed in different directions. It should be understood that the previously described set of five transmit beams is for illustrative purposes and that a different number of transmit beams may be used in other aspects. The UE 604 may sweep through a set of five receive beams, such as the receive beams 616, 618, 620, 622 and 624, to measure the strengths of the transmit beams 606, 608, 610, 612 and 614. In other words, the UE 604 may configure its directional antenna so as to receive transmissions (e.g., transmissions from the base station 602 in one or more of the transmit beams 606, 608, 610, 612 and 614) arriving from specific directions. For example, the UE 604 may sweep through the set of five receive beams by implementing multiple antenna sub-arrays. It should be understood that the previously described set of five receive beams is for illustrative purposes and that a different number of receive beams may be used in other aspects.

The UE 604 may select one or more of the transmit beams 606, 608, 610, 612 and 614 based on the measurements (e.g., the UE 604 may select one or more beams having the highest strengths). For example, with reference to FIG. 6, the UE 604 may select the transmit beam 608 (e.g., received via the receive beam 618), which may have the highest signal strength among the five transmit beams. The UE may further select the transmit beam 612 (e.g., received via the receive beam 622), which may have the second highest signal strength among the five transmit beams. The UE 604 may report the indices of the selected beams (e.g., the transmit beams 608, 612) to the base station 602. In some aspects of the disclosure, the receive beams of the UE 604 may not be reported. The base station 602 and the UE 604 may establish multiple beam pairs (also referred to as a beam pair links (BPLs)) after the P-1 beam sweep and beam reporting. For example, and as shown in FIG. 6, the base station 602 and the UE 604 may establish a first beam pair 626 including the transmit beam 608 and the receive beam 618, and a second beam pair 628 including the transmit beam 612 and the receive beam 622.

Figure 7:
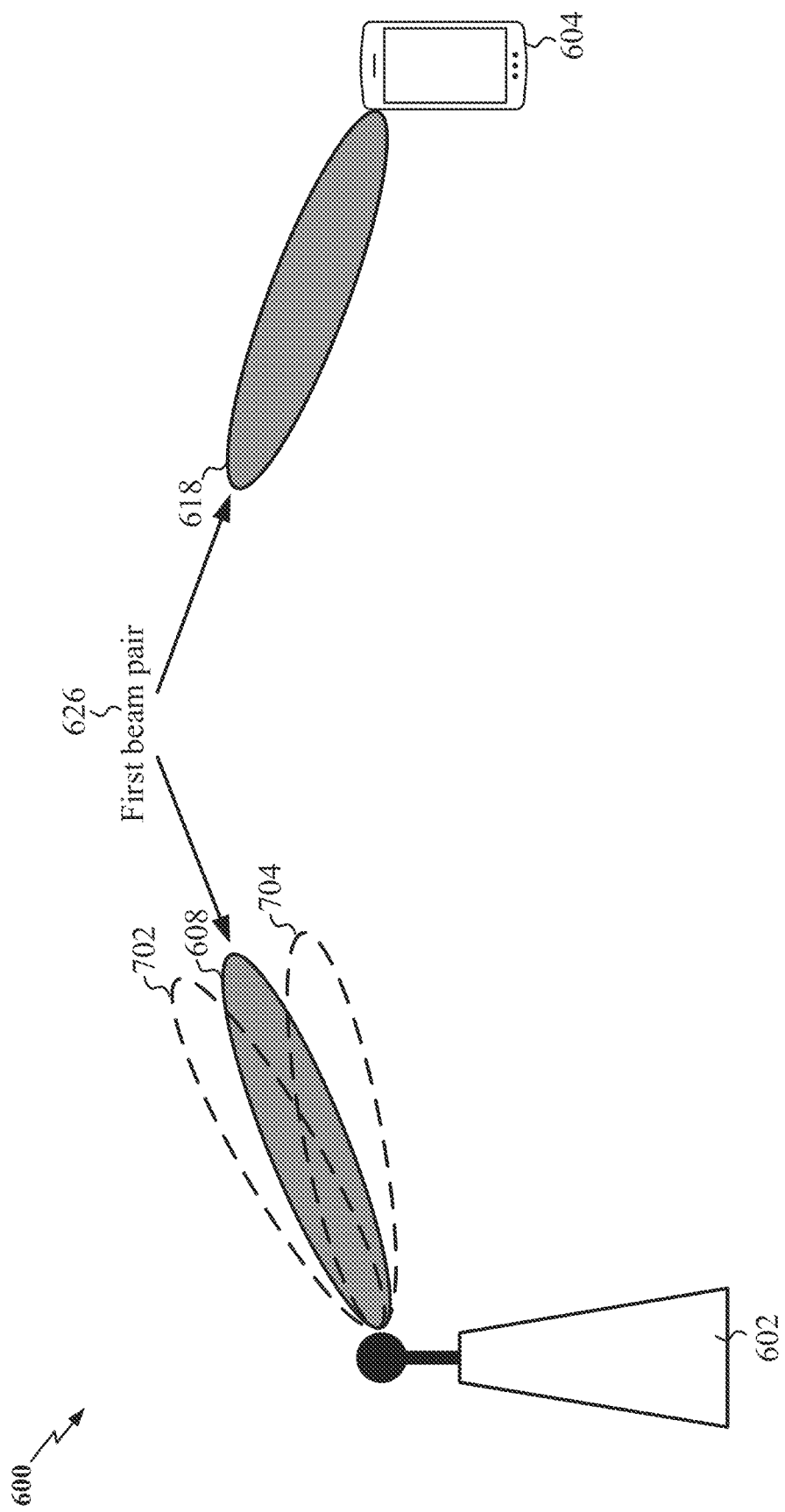
FIG. 7 illustrates a first example of a P-2 beam sweep operation in the example wireless communication network in accordance with various aspects of the disclosure.

FIG. 7 illustrates a first example of a P-2 beam sweep operation in the example wireless communication network 600 in accordance with various aspects of the disclosure. As shown in FIG. 7, the base station 602 may sweep through a first set of refined transmit beams, such as the refined transmit beams 702 and 704, while the UE 604 maintains the receive beam 618. In some aspects, and as shown in FIG. 7, the refined transmit beams 702 and 704 may be transmitted in directions that are slightly deviated from the direction of the transmit beam 608 of the first beam pair 626. It should be understood that the previously described first set of refined transmit beams is for illustrative purposes and that a different number of refined transmit beams may be used in other aspects. The UE 604 may perform measurements of signals received via the receive beam 618 as the base station 602 sweeps through the first set of refined transmit beams.

Figure 8:
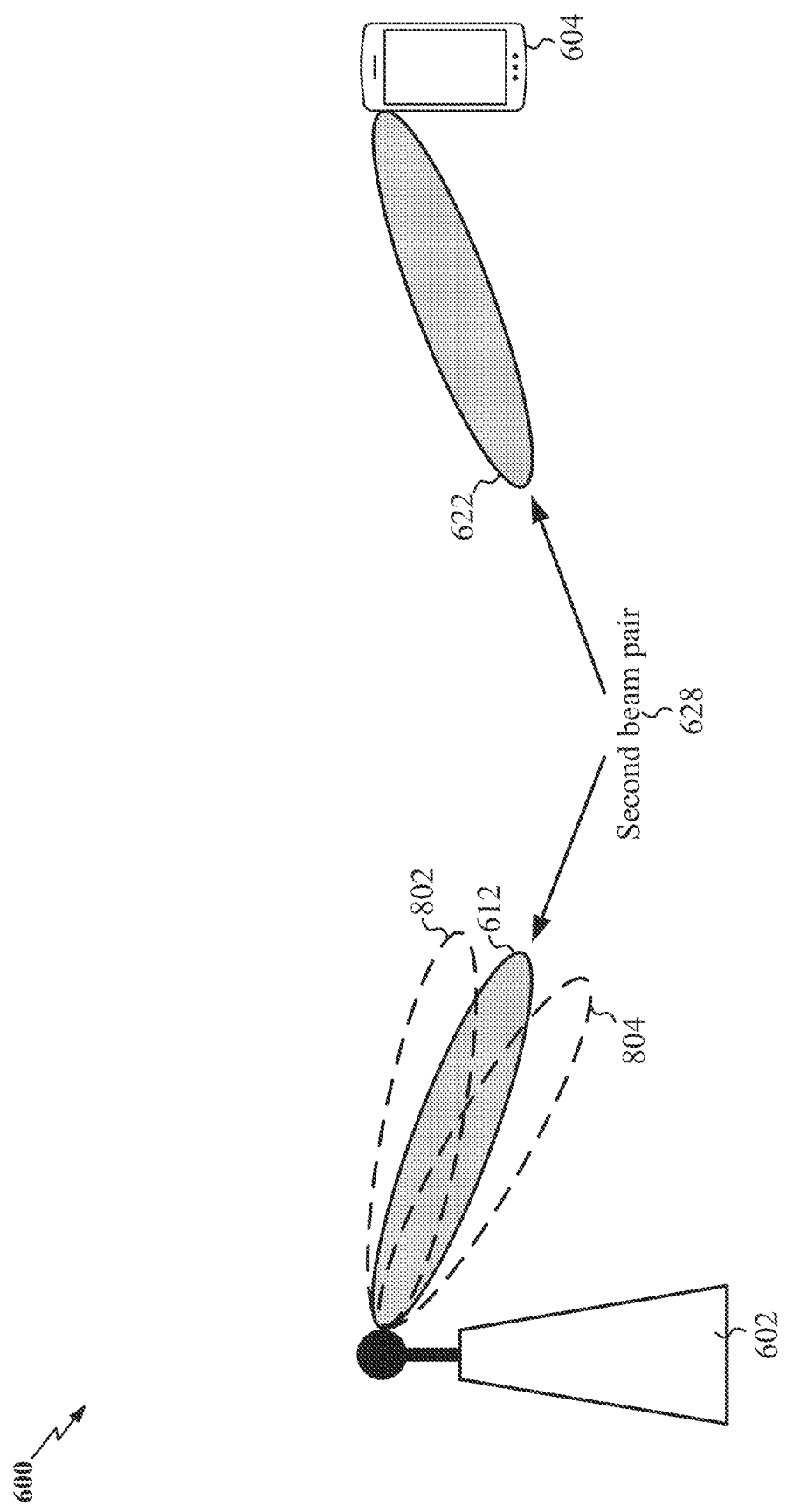
FIG. 8 illustrates a second example of a P-2 beam sweep operation in the example wireless communication network in accordance with various aspects of the disclosure.

FIG. 8 illustrates a second example of a P-2 beam sweep operation in the example wireless communication network 600 in accordance with various aspects of the disclosure. As shown in FIG. 8, the base station 602 may sweep through a second set of refined transmit beams, such as the refined transmit beams 802 and 804, while the UE 604 maintains the receive beam 622. As shown in FIG. 8, the refined transmit beams 802 and 804 may be transmitted in directions that are slightly deviated from the direction of the transmit beam 612 of the second beam pair 628. The UE 604 may perform measurements of signals received via the receive beam 622 as the base station 602 sweeps through the second set of refined transmit beams.

In some aspects of the disclosure, the UE 604 may perform a U-2 beam sweep operation similar to the P-2 beam sweep operation. In such aspects, the UE 604 may transmit (e.g., during a few OFDM symbols) a sounding reference signal for a selected base station beam with the same transmit beam maintained by the UE 604, and the base station 602 may sweep through a set of receive beams. This may be useful in scenarios where the UE 604 does not have beam correspondence.

Figure 9:
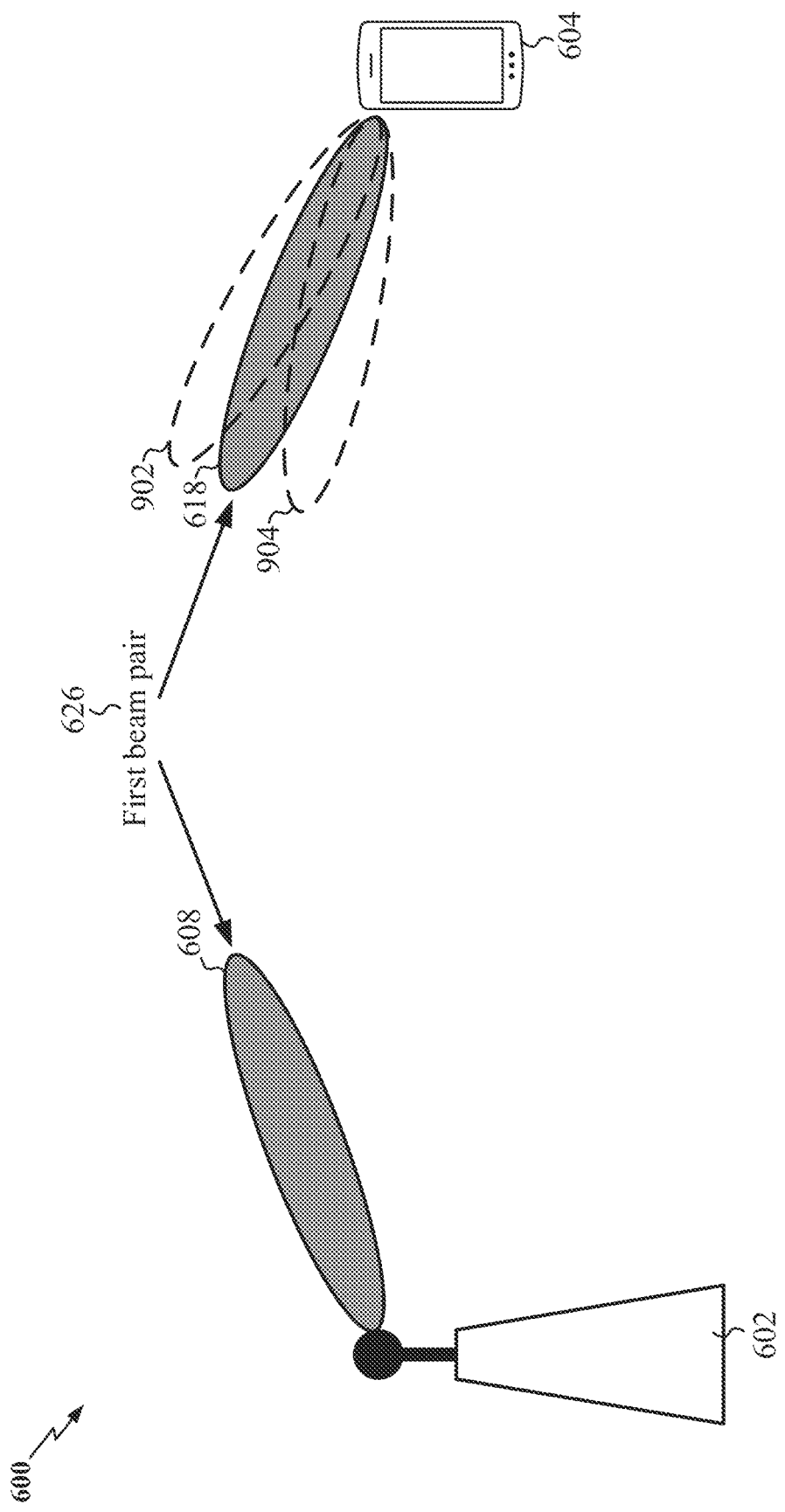
FIG. 9 illustrates a first example of a P-3 beam sweep operation in the example wireless communication network in accordance with various aspects of the disclosure.

FIG. 9 illustrates a first example of a P-3 beam sweep operation in the example wireless communication network 600 in accordance with various aspects of the disclosure. As shown in FIG. 9, the UE 604 may sweep through a first set of refined receive beams, such as the refined receive beams 902 and 904, while the base station 602 maintains the transmit beam 608. As shown in FIG. 9, the refined receive beams 902 and 904 may be pointed in directions that are slightly deviated from the direction of the receive beam 618. The UE 604 may perform measurements of signals received via the refined receive beams 902 and 904 as the base station 602 transmits the transmit beam 608.

Figure 10:
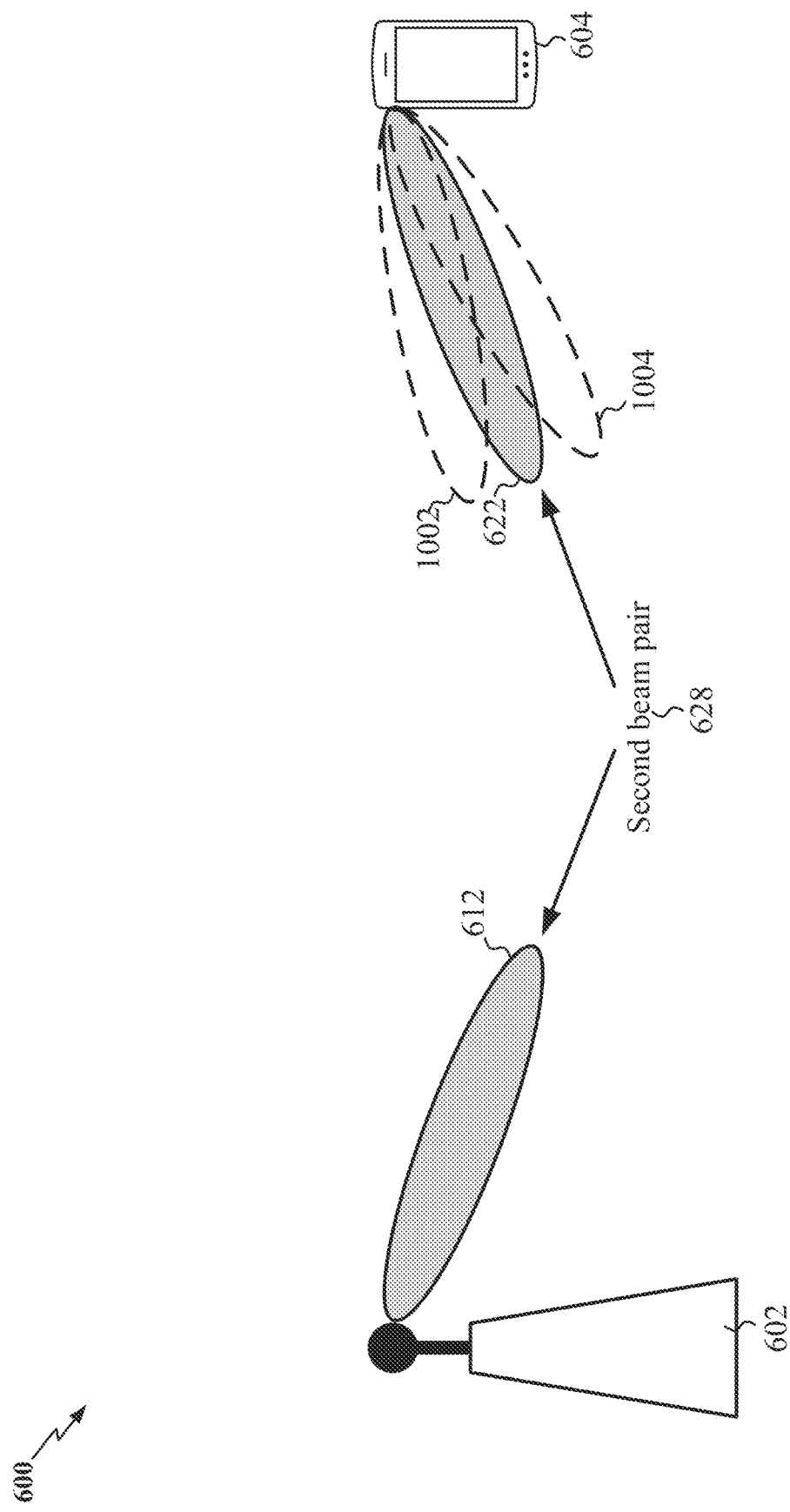
FIG. 10 illustrates a second example of a P-3 beam sweep operation in the example wireless communication network 600 in accordance with various aspects of the disclosure.

FIG. 10 illustrates a second example of a P-3 beam sweep operation in the example wireless communication network 600 in accordance with various aspects of the disclosure. As shown in FIG. 10, the UE 604 may sweep through a second set of refined receive beams, such as the refined receive beams 1002 and 1004, while the base station 602 maintains the transmit beam 612. As shown in FIG. 10, the refined receive beams 1002 and 1004 may be pointed in directions that are slightly deviated from the direction of the receive beam 622. The UE 604 may perform measurements of signals received via the refined receive beams 1002 and 1004 as the base station 602 transmits the transmit beam 612.

In some aspects of the disclosure, the UE 604 may perform a U-3 beam sweep operation similar to the P-3 beam sweep operation. In such aspects, the UE 604 may sweep through a set of refined transmit beams by transmitting a sounding reference signal (e.g., during a few OFDM symbols) for a selected base station receive beam while the base station 602 maintains only one receive beam. This may be useful in scenarios where the UE 604 does not have beam correspondence.

Control of the frequency of P-2 and P-3 beam sweep operations, and the frequency of P-1 report transmissions will now be described. As previously described, a base station and a UE may establish multiple beam pairs. For example, in the configuration of FIG. 6, the base station 602 and the UE 604 may establish two beam pairs (e.g., the first beam pair 626 and the second beam pair 628). In one example scenario, the path of the first beam pair 626 may be through a static environment, whereas the path of the second beam pair 628 may be through a more dynamic environment (e.g. through streets where cars are passing by). In such an example, the second beam pair 628 may need more frequent P-2 and P-3 beam sweep operations and/or more frequent P-1 report transmissions than the first beam pair 626. However, when a base station has full control as to the frequency of P-2 and P-3 beam sweep operations and/or the frequency of P-1 report transmissions, there may be occasions where the P-2 and P-3 beam sweep operations and/or the P-1 report transmissions with respect to a beam pair are not performed with the needed regularity to maintain beam alignment. For example, a base station may rely on fluctuations in RSRPs reported by the UE to determine how frequently the P-2 and P-3 beam sweep operations should be performed and/or how frequently P-1 reports should be transmitted by the UE. It should be noted that such fluctuations may depend on how often the base station is scheduling the UE to report a beam index and a signal strength (RSRP) via a physical uplink control channel (PUCCH) or a physical uplink shared channel (PUSCH), and/or how often the base station is scheduling the P-2 and P-3 beam sweep operations for different beam pairs.

In some aspects of the disclosure, the UE 604 may be configured to detect a fluctuation in the strength of a beam (e.g., a fluctuation in the strength of a signal received at the UE via a receive beam) and indicate such fluctuation to the base station 602. The base station 602 may then determine how to control the frequency of the P-2 and P-3 beam sweep operations and/or the P-1 report transmissions for an individual beam based on the indication. Therefore, since the UE 604 may be more aware than the base station 602 of fluctuations in the strength of an individual beam, the UE 604 may influence the frequency of the P-2 and P-3 beam sweep operations and/or the P-1 report transmissions scheduled by the base station 602 for the individual beam.

Figure 11:
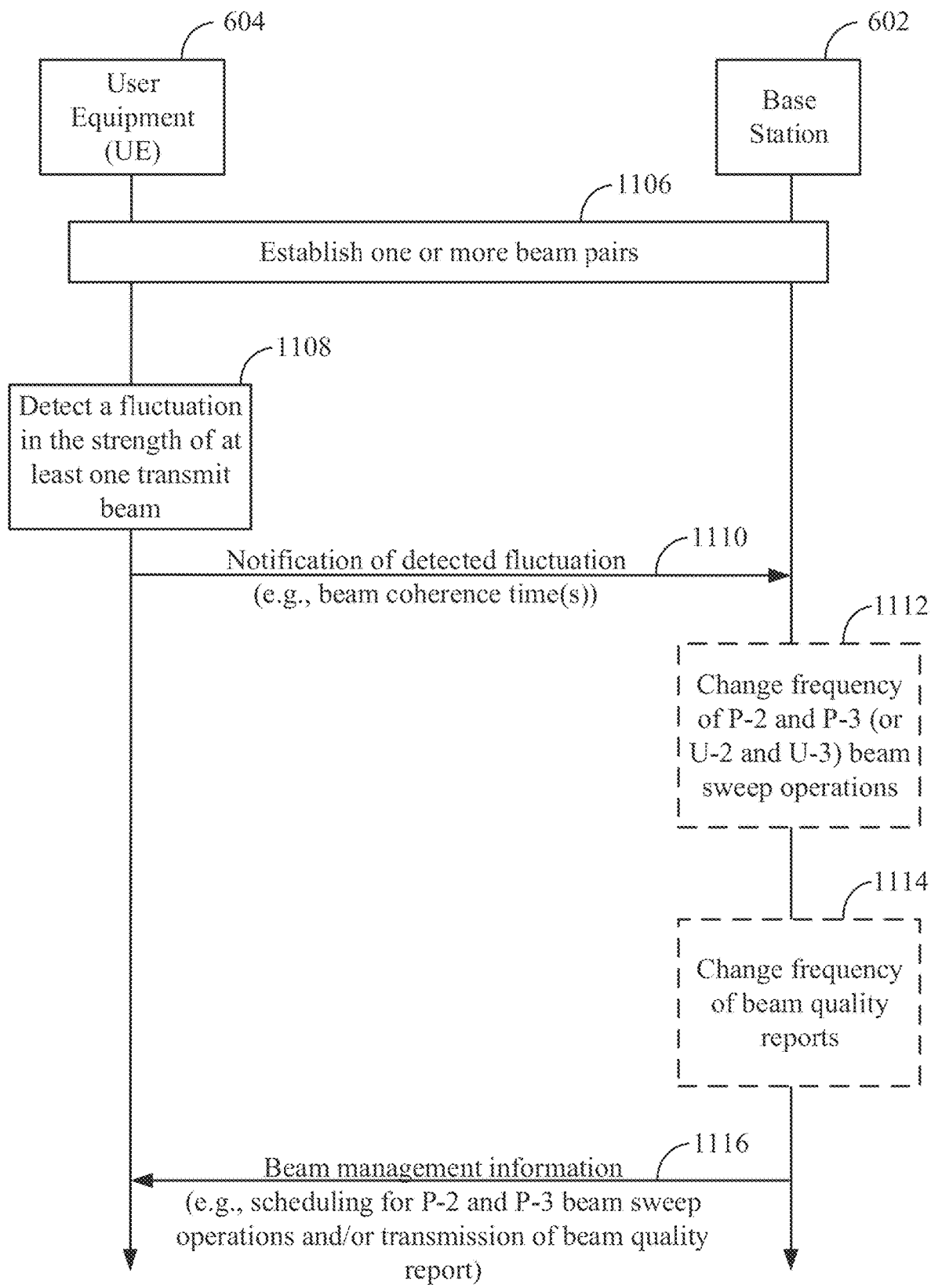
FIG. 11 is a signal flow diagram in accordance with some aspects of the disclosure.

FIG. 11 is a signal flow diagram in accordance with some aspects of the disclosure. As shown in FIG. 11, the base station 602 and the UE 604 may establish 1106 one or more beam pairs. In one aspect of the disclosure, the UE 604 may detect 1108 a fluctuation in the strength of at least one transmit beam (e.g., the transmit beam 608 and/or 612 in FIG. 6) from the base station 602. In one aspect of the disclosure, the UE 604 may transmit a message 1110 to inform the network of the detected fluctuation in the strength of the at least one transmit beam. For example, such fluctuation may be indicated to the base station 602 by reporting a beam coherence time for the at least one transmit beam. The beam coherence time may be defined as the average time over which the transmit beam (e.g., transmit beam 608) of a beam pair (e.g., first beam pair 626) remains aligned with the corresponding receive beam (e.g., receive beam 618) of the beam pair. For a given beam width of a receive beam, the receive beam may be said to become misaligned when the receive power (e.g., as measured by the UE via a receive beam) falls below a certain ratio $\zeta \in [0, 1]$ compared to the peak receive power. Assuming that the transmit beam is pointing at the peak direction at time t, the UE 604 may determine the beam coherence time $\tau$ by determining the infimum of $\tau$ from the set expressed as: $[\tau | P(t+\tau)/P(t) < q]^1$. The infimum is defined as the greatest lower bound of the set. Therefore, the UE 604 may determine the beam coherence time $\tau$ by determining the infimum of $\tau$ from the set of all $\tau$'s that satisfy the following equation (1):

$$P(t+\tau)/P(t) < q \quad \text{equation (1)}$$

where $P(t+\tau)$ represents the power at time $t+\tau$, $P(t)$ represents the power at time t, and q represents a threshold value. For example, q may be a value between zero and one. Alternatively stated, $\tau$ may indicate the minimum amount of time after time t where the ratio of the receive power for a transmit beam at time $t+\tau$ to the receive power for the transmit beam at time t falls below the threshold q. For example, P(t) may represent the received power measured by the UE 604 after the base station 602 and the UE 604 have established a beam pair (e.g., after performing the P-1, P2, and P-3 beam sweep operations). In some aspects of the disclosure, the received power P(t) may be determined from the following equation (2):

$$P(t) = |v'H(t)u|^2 \quad \text{equation (2)}$$

where H(t) (also expressed as $H_{N \times M}(t)$, where N represents the number of receive antennas and M represents the number of transmit antennas) may represent the channel matrix at time t, u (also expressed as $u_{M \times 1}$) may represent the transmit (TX) beamforming vector, and v (also expressed as $v_{N \times 1}$) may represent the receive (RX) beamforming vector. In some aspects of the disclosure, the base station 602 may provide the value of q to the UE 604. In other aspects of the disclosure, the value of q may be predefined (e.g., set by a wireless communication standard). In some aspects of the disclosure, the base station 602 may decide how often a beam should be transmitted for a P-2 beam sweep operation or a P-3 beam sweep operation, and/or how often the UE 604 may be allowed to transmit a P-1 report, based on the reported beam coherence time $\tau$ of the beam and/or the signal strength of the beam provided by the UE 604.

In one aspect of the disclosure, the UE 604 may report (e.g., via message 1110) that the received power of one transmit beam (e.g., the transmit beam 612 of the second beam pair 628) from the base station 602 fluctuates more than the received power of another transmit beam (e.g., the transmit beam 608 of the first beam pair 626) from the base station 602. For example, the UE 604 may report that the beam coherence time of the transmit beam 612 of the second beam pair 628 is shorter than the beam coherence time of the transmit beam 608 of the first beam pair 626. In response to the report from the UE 604, the base station 602 may change (e.g., increase) 1112 the frequency of P-2 and P-3 (or U-2/U-3) beam sweep operations for the transmit beam 612 such that the frequency of P-2 and P-3 (or U-2/U-3) beam sweep operations for the transmit beam 612 exceeds the frequency of beam sweep operations for the transmit beam 608. Also in response to the report from the UE 604, the base station 602 may change (e.g., increase) 1114 the frequency of P-1 report transmissions (also referred to as beam quality report transmissions) by the UE 604 for the transmit beam 612 such that the frequency of P-1 report transmissions for the transmit beam 612 exceeds the frequency of P-1 report transmissions for the transmit beam 608. In one aspect of the disclosure, and with reference to FIG. 11, the base station 602 may transmit a message 1116 including beam management information to the UE 604. For example, the beam management information may include scheduling information for more frequent P-2 and P-3 beam sweep operations and/or scheduling for more frequent transmissions of P-1 reports (also referred to as beam quality reports).

In some aspects of the disclosure, the beam coherence time may depend on the beam width of the received beam at the UE 604. In one example, the base station 602 may instruct the UE 604 to use a receive beam with the same beam width (also referred to as a constant beam width) when measuring and reporting a fluctuation in the strength of a transmit beam. In another example, the UE 604 may be preconfigured (e.g., in accordance with a wireless communication standard, such the 5G standard) to use a receive beam with the same beam width while measuring and reporting a fluctuation in the strength of a transmit beam. In some aspects of the disclosure, the base station 602 may configure the UE 604 to transmit a P-1 report that includes the beam width of the receive beam in addition to the fluctuation in the strength of a transmit beam.

Control over the frequency of the P-2 and P-3 beam sweep operations in relation to the frequency of P-1 report transmissions will now be described. In some scenarios, the beam coherence time of the UE 604 may be short (e.g., below a threshold) as a result of a pointing error due to receiver motion (e.g., movement by the UE 604). Such a pointing error may be corrected by performing frequent P-2 and P-3 beam sweep operations. In some scenarios, the beam coherence time of the UE 604 may be short due to the Doppler effect. However, this may be overcome with frequent P-1 report transmissions from the UE 604 to the base station 602. Therefore, in some aspects of the disclosure, the UE 604 may inform the base station 602 regarding the reason for the short beam coherence time and the base station 602 may act accordingly. Initially, the UE 604 may detect frequent fluctuations in the strength of a transmit beam from the base station 602 without knowing the particular reason for the detected fluctuations. If the base station 602 performs more frequent P-2 and P-3 beam sweep operations and the strength of the transmit beam improves, the UE 604 may assume that the detected fluctuations resulted from a pointing error. Otherwise, the UE 604 may assume that the detected fluctuations resulted from the Doppler effect. A similar procedure may occur when the base station 602 schedules more frequent P-1 report transmissions for the UE 604 as well. For example, if the base station 602 schedules more frequent P-1 report transmissions for the UE 604 and the strength of the transmit beam improves, the UE 604 may assume that the detected fluctuations resulted from the Doppler effect. Otherwise, the UE 604 may assume that the detected fluctuations resulted from a pointing error.

In some aspects of the disclosure, the UE 604 may transmit a request to the base station 602 regarding its desired periodicity of P-2 and P-3 beam sweep operations or its desired periodicity of P-1 report transmissions for different transmit beams from the base station 602. In some aspects of the disclosure, one or more of the previously described periodicities may be different for different transmit beams from the base station 602. In some aspects of the disclosure, the base station 602 may be mandated to abide by the request transmitted from the UE 604. In other aspects, the base station 602 may determine whether or not to fulfil the request transmitted from the UE 604. In some aspects of the disclosure, the UE 604 may transmit a request to the base station 602 to immediately initiate P-2 and P-3 beam sweep operations or to allow an immediate transmission of a P-1 report for one or more transmit beams from the base station 602.

In some aspects of the disclosure, the UE 604 may inform the base station 602 to schedule more P-2 and P-3 beam sweep operations (or to schedule more U-2 and U-3 beams sweep operations) for the transmit beam 612 of the second beam pair 628 or to schedule more P-1 report transmissions (or to schedule more U-1 report transmissions) for the transmit beam 612 of the second beam pair 628. In some aspects of the disclosure, UE 604 may specifically mention the desired frequency of P-2 and P-3 beam sweep operations (or the desired frequency of U-2 and U-3 beams sweep operations) or the desired frequency of P-1 report transmissions (or U-1 report transmissions) for the transmit beam 612 of the second beam pair 628.

In some aspects of the disclosure, the base station 602 may configure the UE 604 as described herein using a PBCH, a remaining minimum system information (RMSI), other system information (OSI), a physical downlink control channel (PDCCH), a physical downlink shared channel (PDSCH), a medium access control (MAC) control element (CE), a radio resource control (RRC) message, or a handover report, or any combination thereof. In some aspects of the disclosure, the UE 604 may convey information regarding the variation of beam quality (e.g., fluctuations in a strength of a transmit beam) in the time domain to the base station 602 using a random access channel (RACH) procedure (Msg1/2/3/4, etc.), a PUCCH, a PUSCH, or a scheduling request, or any combination thereof.

Figure 12:
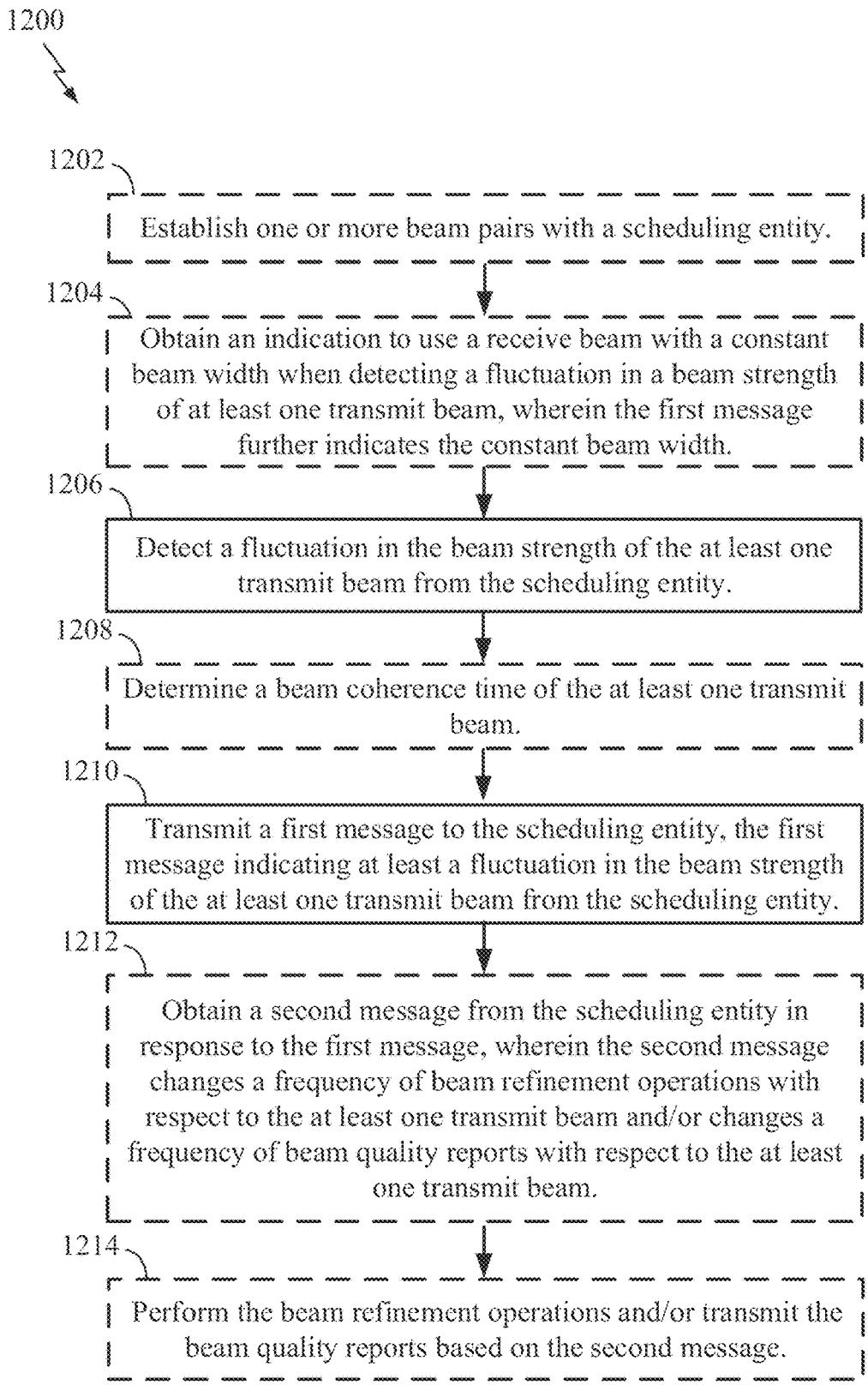
FIG. 12 is a flow chart illustrating an exemplary process according to some aspects of the disclosure.

FIG. 12 is a flow chart illustrating an exemplary process 1200 in accordance with some aspects of the present disclosure. As described below, some or all illustrated features may be omitted in a particular implementation within the scope of the present disclosure, and some illustrated features may not be required for implementation of all embodiments. In some examples, the process 1200 may be carried out by the scheduled entity 500 (e.g., which may correspond to the UE 604 described herein) illustrated in FIG. 5. In some examples, the process 1200 may be carried out by any suitable apparatus or means for carrying out the functions or algorithm described below. It should be understood that the blocks represented with dashed lines in FIG. 12 represent optional blocks.

At block 1202, the scheduled entity may establish one or more beam pairs with a scheduling entity (e.g., which may correspond to the base station 602 described herein), such as the scheduling entity 400 illustrated in FIG. 4. At block 1204, the scheduled entity may obtain an indication to use a receive beam with a constant beam width when detecting the fluctuation in the beam strength of at least one transmit beam. At block 1206, the scheduled entity may detect a fluctuation in the beam strength of the at least one transmit beam from the scheduling entity. In an aspect, the at least one transmit beam may be included in the one or more beam pairs. At block 1208, the scheduled entity may determine a beam coherence time of the at least one transmit beam. In an aspect of the disclosure, the beam coherence time may be an average time over which the at least one transmit beam remains aligned. In an aspect of the disclosure, the average time may indicate a duration after which a received power for a current beam, with respect to the received power with the same beam prior to the duration, falls below a threshold. In such aspect, the first message may further indicate a reason for the beam coherence time being below the threshold. For example, the reason may indicate at least an infrequent beam refinement, an infrequent beam report, a higher mobility, a rotation of the scheduled entity, a higher Doppler spread, or combinations thereof. In an aspect, the threshold may be pre-defined or configured by the network. For example, the threshold may be received from the network through at least a master information block (MIB), a remaining minimum system information (RMSI), other system information (OSI), downlink control information (DCI), a radio resource control (RRC) signal, a medium access control (MAC) control element (CE) signal, a random access response message (e.g., Msg2), a content resolution message (e.g., Msg4), a handover message, or combinations thereof.

At block 1210, the scheduled entity may transmit a first message to the scheduling entity, the first message indicating at least a fluctuation in a beam strength of at least one transmit beam from the scheduling entity. In an aspect of the disclosure, the scheduled entity may transmit the first message through a random access preamble message (e.g., Msg1), a radio resource control (RRC) connect request message (e.g., Msg3), a physical uplink control channel (PUCCH), a physical uplink shared channel (PUSCH), or combinations thereof. In some aspects of the disclosure, the scheduled entity may transmit the first message after being configured to transmit the first message by the scheduling entity. In such aspects, the scheduled entity may obtain the configuration via at least a master information block (MIB), a remaining minimum system information (RMSI), other system information (OSI), a downlink control information (DCI), radio resource control (RRC) signaling, a medium access control (MAC) control element (CE) signal, a random access response message (e.g., Msg2), a content resolution message (e.g., Msg4), a handover message, or combinations thereof. In some aspects of the disclosure, the first message further indicates the beam strength of the at least one transmit beam.

At block 1212, the scheduled entity may obtain a second message from the scheduling entity in response to the first message, wherein the second message changes (e.g., increases or decreases) a frequency of beam refinement operations with respect to the at least one transmit beam and/or changes (e.g., increases or decreases) a frequency of beam quality reports with respect to the at least one transmit beam. At block 1214, the scheduled entity may perform the beam refinement operations and/or transmit the beam quality reports based on the second message.

In some aspects of the disclosure, the scheduled entity may determine the beam coherence time by determining a first beam coherence time of a first transmit beam associated with a first beam pair, and a second beam coherence time of a second transmit beam associated with a second beam pair, the second beam coherence time being less than the first beam coherence time. In such aspects of the disclosure, the first message may further indicate the first and second beam coherence times, and the second message may change a first frequency of beam refinement operations with respect to the first transmit beam and may change a second frequency of beam refinement operations with respect to the second transmit beam, the second frequency of beam refinement operations being greater than the first frequency of beam refinement operations. In some aspects of the disclosure, the second message may change a first frequency of beam quality reports with respect to the first transmit beam and may change a second frequency of beam quality reports with respect to the second transmit beam, the second frequency of beam quality reports being greater than the first frequency of beam quality reports.

Figure 13:
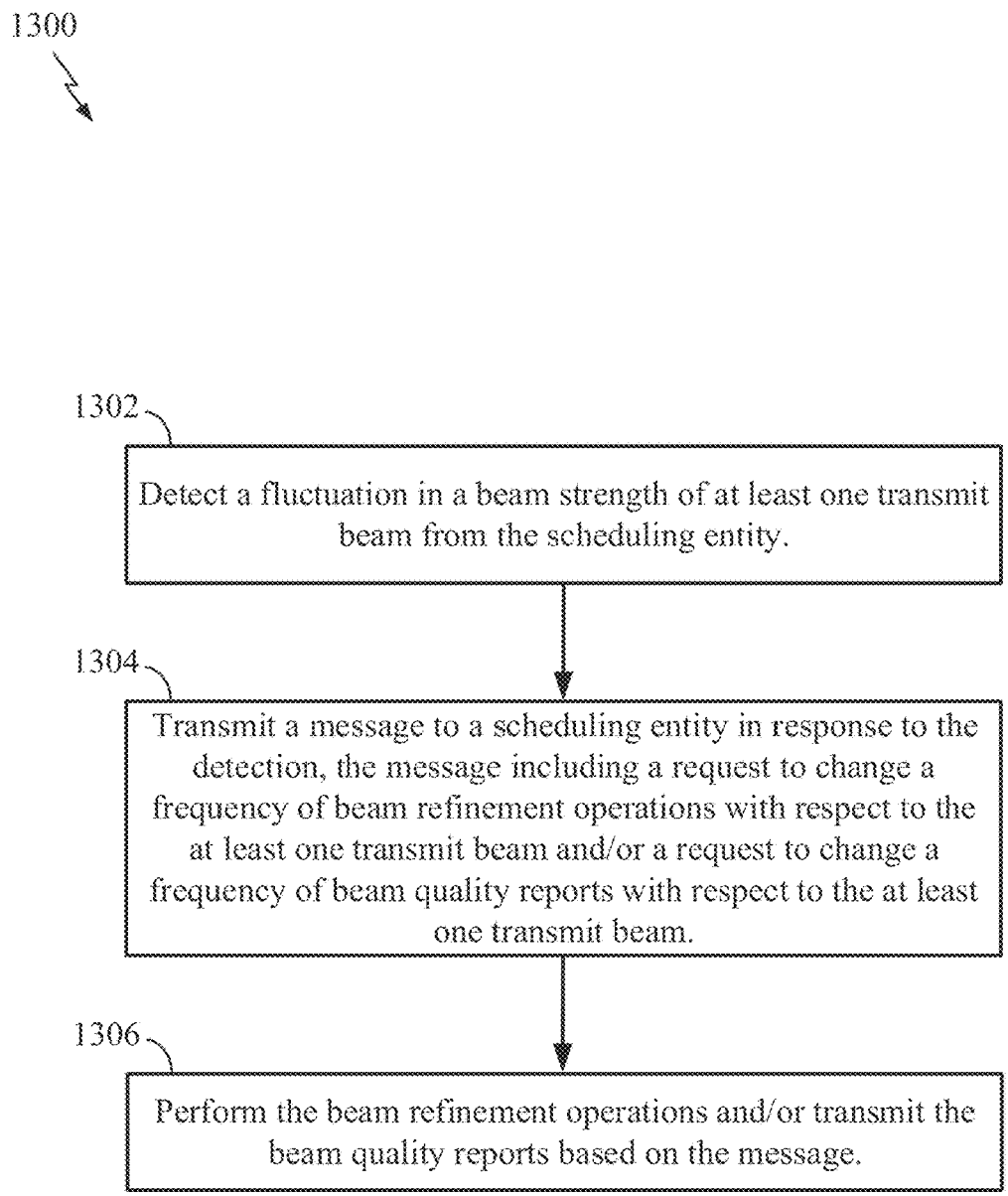
FIG. 13 is a flow chart illustrating an exemplary process according to some aspects of the disclosure.

FIG. 13 is a flow chart illustrating an exemplary process 1300 in accordance with some aspects of the present disclosure. As described below, some or all illustrated features may be omitted in a particular implementation within the scope of the present disclosure, and some illustrated features may not be required for implementation of all embodiments. In some examples, the process 1300 may be carried out by the scheduled entity 500 illustrated in FIG. 5. In some examples, the process 1300 may be carried out by any suitable apparatus or means for carrying out the functions or algorithm described below.

At block 1302, the scheduled entity may detect a fluctuation in a beam strength of at least one transmit beam from the scheduling entity. At block 1304, the scheduled entity may transmit a message to a scheduling entity in response to the detection, the message including a request to change (e.g., increase or decrease) a frequency of beam refinement operations with respect to the at least one transmit beam and/or a request to change (e.g., increase or decrease) a frequency of beam quality reports with respect to the at least one transmit beam. At block 1306, the scheduled entity may perform the beam refinement operations and/or transmit the beam quality reports based on the message.

In one or more examples, the computer-readable storage medium 506 may include software 560, 562, 564 566, 568 and 570 configured for various functions. For example, the software 560, 562, 564 566, 568 and 570 may be configured to implement one or more of the functions described above in relation to FIGS. 12 and 13.

In one configuration, the apparatus 500 for wireless communication includes means for detecting a fluctuation in a beam strength of at least one transmit beam from a scheduling entity, means for transmitting a first message to the scheduling entity (e.g., the first message may indicate at least the fluctuation in the beam strength of the at least one transmit beam from the scheduling entity), means for obtaining a second message from the scheduling entity in response to the first message (e.g., the second message may change a frequency of beam refinement operations with respect to the at least one transmit beam and/or may change a frequency of beam quality reports with respect to the at least one transmit beam), means for performing the beam refinement operations based on the second message, means for transmitting the beam quality reports based on the second message, means for determining a beam coherence time of the at least one transmit beam, wherein the fluctuation is indicated as the beam coherence time, means for establishing one or more beam pairs with the scheduling entity, means for obtaining an indication to use a receive beam with a constant beam width when detecting the fluctuation in the beam strength of the at least one transmit beam, wherein the first message further indicates the constant beam width, means for detecting a fluctuation in a beam strength of at least one transmit beam from a scheduling entity, means for transmitting a message to the scheduling entity in response to the detection (e.g., the message including a request to change a frequency of beam refinement operations with respect to the at least one transmit beam and/or a request to change a frequency of beam quality reports with respect to the at least one transmit beam), means for performing the beam refinement operations based on the message, and means for transmitting the beam quality reports based on the message. In one aspect, the aforementioned means may be the processor(s) 504 shown in FIG. 5 configured to perform the functions recited by the aforementioned means. In another aspect, the aforementioned means may be a circuit or any apparatus configured to perform the functions recited by the aforementioned means.

Of course, in the above examples, the circuitry included in the processor 504 is merely provided as an example, and other means for carrying out the described functions may be included within various aspects of the present disclosure, including but not limited to the instructions stored in the computer-readable storage medium 506, or any other suitable apparatus or means described in any one of the FIGS. 1, 2, and/or 3, and utilizing, for example, the processes and/or algorithms described herein in relation to FIGS. 12 and/or 13.

Figure 14:
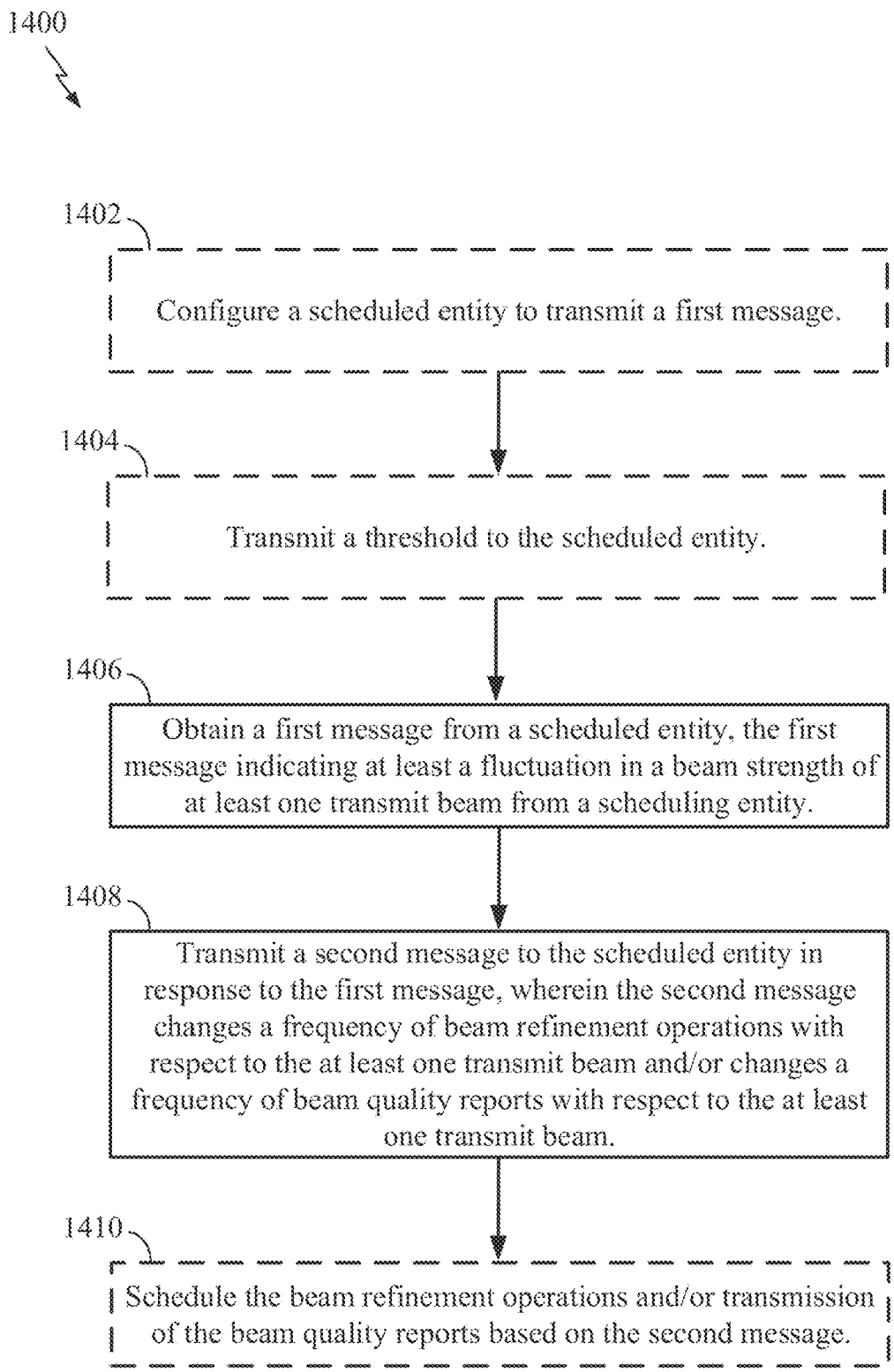
FIG. 14 is a flow chart illustrating an exemplary process according to some aspects of the disclosure.

FIG. 14 is a flow chart illustrating an exemplary process 1400 in accordance with some aspects of the present disclosure. As described below, some or all illustrated features may be omitted in a particular implementation within the scope of the present disclosure, and some illustrated features may not be required for implementation of all embodiments. In some examples, the process 1400 may be carried out by the scheduling entity 400 illustrated in FIG. 4. In some examples, the process 1400 may be carried out by any suitable apparatus or means for carrying out the functions or algorithm described below. It should be understood that the blocks represented with dashed lines in FIG. 14 represent optional blocks.

At block 1402, the scheduling entity may configure a scheduled entity to transmit a first message. In some aspects, the first message may indicate at least a fluctuation in a beam strength of at least one transmit beam from the scheduling entity. At block 1404, the scheduling entity may transmit a threshold to the scheduled entity. In some aspects, the threshold may be used by the scheduled entity to detect the fluctuation in a beam strength of at least one transmit beam from the scheduling entity. At block 1406, the scheduling entity may obtain the first message from the scheduled entity, the first message indicating at least a fluctuation in a beam strength of at least one transmit beam from the scheduling entity. At block 1408, the scheduling entity may transmit a second message to the scheduled entity in response to the first message, wherein the second message changes (e.g., increases or decreases) a frequency of beam refinement operations with respect to the at least one transmit beam and/or changes (e.g., increases or decreases) a frequency of beam quality reports with respect to the at least one transmit beam. At block 1410, the scheduling entity may schedule the beam refinement operations and/or transmission (e.g., from the scheduled entity) of the beam quality reports based on the second message.

Figure 15:
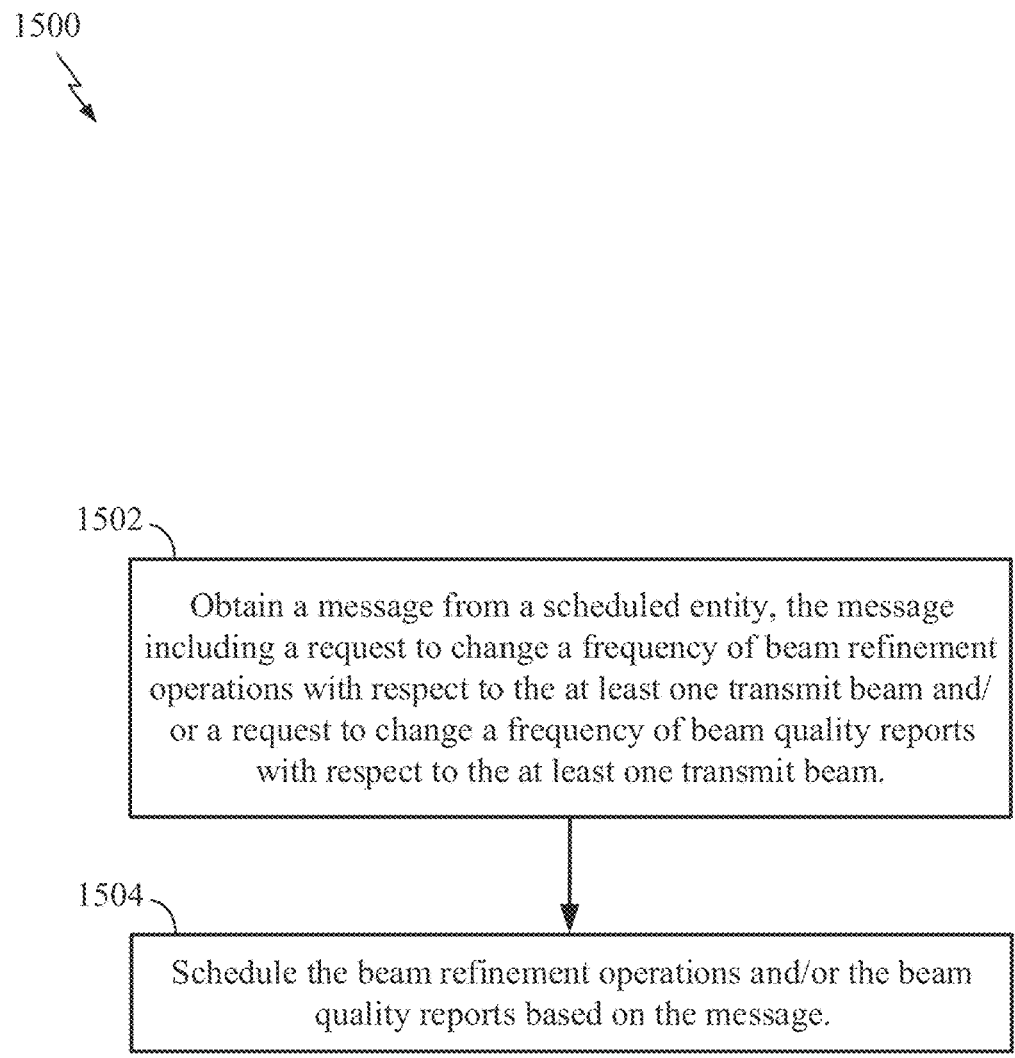
FIG. 15 is a flow chart illustrating an exemplary process according to some aspects of the disclosure.

FIG. 15 is a flow chart illustrating an exemplary process 1500 in accordance with some aspects of the present disclosure. As described below, some or all illustrated features may be omitted in a particular implementation within the scope of the present disclosure, and some illustrated features may not be required for implementation of all embodiments. In some examples, the process 1500 may be carried out by the scheduling entity 400 illustrated in FIG. 4. In some examples, the process 1500 may be carried out by any suitable apparatus or means for carrying out the functions or algorithm described below.

At block 1502, the scheduling entity may obtain a message from a scheduled entity, the message including a request to change (e.g., increase or decrease) a frequency of beam refinement operations with respect to the at least one transmit beam and/or a request to change (e.g., increase or decrease) a frequency of beam quality reports with respect to the at least one transmit beam. At block 1504, the scheduling entity may schedule the beam refinement operations and/or the beam quality reports based on the message.

In one or more examples, the computer-readable storage medium 406 may include software 460, 462, 464, and 466 configured for various functions. For example, the software 460, 462, 464, and 466 may be configured to implement one or more of the functions described above in relation to FIGS. 14 and 15.

In one configuration, the apparatus 400 for wireless communication includes means for obtaining a first message from a scheduled entity (e.g., the first message indicating at least a fluctuation in a beam strength of at least one transmit beam from a scheduling entity), means for transmitting a second message to the scheduled entity in response to the first message (e.g., the second message may change a frequency of beam refinement operations with respect to the at least one transmit beam and/or may change a frequency of beam quality reports with respect to the at least one transmit beam), means for scheduling beam refinement operations based on the second message, means for scheduling transmission of beam quality reports from the scheduled entity based on the second message, means for transmitting the threshold to the scheduled entity, means for configuring the scheduled entity to transmit the first message, means for obtaining a message from a scheduled entity (e.g., the message including a request to change a frequency of beam refinement operations with respect to the at least one transmit beam and/or a request to change a frequency of beam quality reports with respect to the at least one transmit beam), means for scheduling the beam refinement operations based on the message, and/or means for scheduling the beam quality reports based on the message. In one aspect, the aforementioned means may be the processor(s) 404 shown in FIG. 4 configured to perform the functions recited by the aforementioned means. In another aspect, the aforementioned means may be a circuit or any apparatus configured to perform the functions recited by the aforementioned means.

Of course, in the above examples, the circuitry included in the processor 404 is merely provided as an example, and other means for carrying out the described functions may be included within various aspects of the present disclosure, including but not limited to the instructions stored in the computer-readable storage medium 406, or any other suitable apparatus or means described in any one of the FIGS. 1, 2, and/or 3, and utilizing, for example, the processes and/or algorithms described herein in relation to FIGS. 14 and/or 15.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-15 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-15 may be configured to perform one or more of the methods, features, or steps escribed herein.

The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication, comprising:
    obtaining a first message from a scheduled entity, the first message indicating at least a fluctuation in a beam strength of at least one transmit beam from a scheduling entity, wherein the fluctuation is indicated as a beam coherence time, and wherein the beam coherence time is an average time over which the at least one beam remains aligned; and
    transmitting a second message to the scheduled entity in response to the first message, wherein the second message comprises a change to at least one of a frequency of beam refinement operations with respect to the at least one transmit beam or a frequency of beam quality reports with respect to the at least one transmit beam.

2. The method of claim 1, wherein the change to the frequency of beam refinement operations with respect to the at least one transmit beam includes an increase or a decrease in the frequency of beam refinement operations, and wherein the change to the frequency of beam quality reports with respect to the at least one transmit beam includes an increase or a decrease in the frequency of beam quality reports.

3. The method of claim 1, further comprising:
    scheduling at least one of the beam refinement operations or transmission of the beam quality reports based on the second message.

4. The method of claim 1, wherein the average time indicates a duration after which a received power for a current beam, with respect to the received power for the current beam prior to the duration, falls below a threshold, and wherein the first message further indicates a reason for the beam coherence time being below the threshold.

5. The method of claim 4, wherein the reason indicates at least an infrequent
beam refinement, an infrequent beam report, a higher mobility, a rotation of the scheduled entity, a higher Doppler spread, or combinations thereof.

6. The method of claim 4, further comprising transmitting the threshold to the
scheduled entity, wherein the threshold is transmitted through at least a master information block (MIB), a remaining minimum system information (RMSI), other system information (OSI), downlink control information (DCI), a radio resource control (RRC) signal, a medium access control (MAC) control element (CE) signal, a random access response message, a content resolution message, a handover message, or combinations thereof.

7. The method of claim 1, further comprising:
    configuring the scheduled entity to transmit the first message.

8. An apparatus for wireless communication, comprising:
    a processor;
    a transceiver communicatively coupled to the processor; and
    a memory communicatively coupled to the processor,
    wherein the processor and the memory are configured to:
        obtain a first message from a scheduled entity, the first message indicating at least
    a fluctuation in a beam strength of at least one transmit beam from a scheduling entity, wherein the fluctuation is indicated as a beam coherence time, and wherein the beam coherence time is an average time over which the at least one beam remains aligned; and
        transmit a second message to the scheduled entity in response to the first message, wherein the second message comprises a change to at least one of beam refinement operations with respect to the at least one transmit beam or a frequency of beam quality reports with respect to the at least one transmit beam.

9. The apparatus of claim 8, wherein the change to the frequency of beam refinement operations with respect to the at least one transmit beam includes an increase or a decrease in the frequency of beam refinement operations, and wherein the change to the frequency of beam quality reports with respect to the at least one transmit beam includes an increase or a decrease in the frequency of beam quality reports.

10. The apparatus of claim 8, wherein the processor and the memory are further configured to:
    schedule at least one of the beam refinement operations or transmission of the beam quality reports based on the second message.

11. The apparatus of claim 8, wherein the average time indicates a duration after which a received power for a current beam, with respect to the received power for the current beam prior to the duration, falls below a threshold, and wherein the first message further indicates a reason for the beam coherence time being below the threshold.

12. The apparatus of claim 11, wherein the reason indicates at least an infrequent beam refinement, an infrequent beam report, a higher mobility, a rotation of the scheduled entity, a higher Doppler spread, or combinations thereof.

13. The apparatus of claim 11, wherein the processor and the memory are further configured to:
    transmit the threshold to the scheduled entity, wherein the threshold is transmitted through at least a master information block (MIB), a remaining minimum system information (RMSI), other system information (OSI), downlink control information (DCI), a radio resource control (RRC) signal, a medium access control (MAC) control element (CE) signal, a random access response message, a content resolution message, a handover message, or combinations thereof.

14. The apparatus of claim 8, wherein the processor and the memory are further configured to:
configure the scheduled entity to transmit the first message.

15. A method of wireless communication, comprising:
obtaining a message from a scheduled entity, the message including at least one of:
a request to change a frequency of beam refinement operations with respect to the
at least one transmit beam, wherein the change to the frequency of the beam refinement operations includes more frequent beam refinement operations or less frequent beam refinement operations, or
a request to change a frequency of beam quality reports with respect to the at least
one transmit beam; and
scheduling at least one of the beam refinement operations or the beam quality reports based on the message.

16. The method of claim 15, wherein the change to the frequency of beam quality reports with respect to the at least one transmit beam includes an increase or a decrease in the frequency of beam quality reports.

17. An apparatus for wireless communication, comprising:
a processor;
a transceiver communicatively coupled to the processor; and
a memory communicatively coupled to the processor,
wherein the processor and the memory are configured to:
obtain a message from a scheduled entity, the message including at least one of:
a request to change a frequency of beam refinement operations with respect to the at least one transmit beam, wherein the change to the frequency of the beam refinement operations includes more frequent
beam refinement operations or less frequent beam refinement operations, or
a request to change a frequency of beam quality reports with respect to the
at least one transmit beam; and
schedule at least one of the beam refinement operations or the beam quality reports based on the message.

18. The apparatus of claim 17, wherein the change to the frequency of beam quality reports with respect to the at least one transmit beam includes an increase or a decrease in the frequency of beam quality reports.

* * * * *